(12) United States Patent
Izumi et al.

(10) Patent No.: US 11,791,638 B2
(45) Date of Patent: Oct. 17, 2023

(54) POWER SUPPLY SYSTEM

(71) Applicant: TOYOTA JIDOSHA KABUSHIKI KAISHA, Toyota (JP)

(72) Inventors: Junta Izumi, Nagoya (JP); Kenji Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/831,632

(22) Filed: Jun. 3, 2022

(65) Prior Publication Data

US 2023/0069512 A1 Mar. 2, 2023

(30) Foreign Application Priority Data

Aug. 24, 2021 (JP) ................. 2021-136178

(51) Int. Cl.
 *H02J 7/00* (2006.01)
 *H02J 7/34* (2006.01)
 *H02M 7/537* (2006.01)
 *H02J 3/32* (2006.01)

(52) U.S. Cl.
 CPC ............. *H02J 7/0019* (2013.01); *H02J 3/32* (2013.01); *H02J 7/0016* (2013.01); *H02J 7/0048* (2020.01); *H02J 7/00712* (2020.01); *H02J 7/342* (2020.01); *H02M 7/537* (2013.01); *H02J 2207/20* (2020.01); *Y02E 60/10* (2013.01)

(58) Field of Classification Search
 CPC ............. H01M 10/482; H01M 10/441; H01M 2010/4271; H01M 10/425; Y04S 20/222; Y04S 20/221; Y04S 10/14; Y04S 50/10; Y04S 50/16; H02J 2207/20; H02J 3/32; H02J 7/0013; H02J 7/0016; H02J 7/007; H02J 7/0021; H02J 7/0024; H02J 7/005; H02J 7/0047; H02J 7/0063; H02J 3/14; H02J 7/00712; H02J 7/007194; H02J 7/34; H02J 7/342; H02J 7/0025; Y02E 60/10; G01R 31/392; G01R 31/396; Y02B 70/3225; H02M 7/483
 See application file for complete search history.

(56) References Cited

U.S. PATENT DOCUMENTS

| | | | |
|---|---|---|---|
| 10,014,685 B2 * | 7/2018 | Triebel ...................... | H02J 3/32 |
| 11,424,620 B2 * | 8/2022 | Juang ...................... | H02J 7/007 |
| 2011/0254373 A1 * | 10/2011 | Johnson ................ | H02M 7/483 |
| | | | 307/77 |

FOREIGN PATENT DOCUMENTS

| | | | |
|---|---|---|---|
| BE | 1022874 B1 * | 9/2016 | |
| JP | 2018-074709 A | 5/2018 | |
| KR | 20160028341 A * | 3/2016 | |
| WO | 2018/079664 A1 | 5/2018 | |

* cited by examiner

*Primary Examiner* — Ryan Johnson
(74) *Attorney, Agent, or Firm* — Oliff PLC

(57) ABSTRACT

In a power supply system, a control device is configured to adjust a state of charge of each of an alternating-current battery string and a direct-current battery string by power transfer between the alternating-current battery string and the direct-current battery string before performing requested energy management.

12 Claims, 11 Drawing Sheets

POWER SUPPLY SYSTEM

CROSS-REFERENCE TO RELATED APPLICATION

This application claims priority to Japanese Patent Application No. 2021-136178 filed on Aug. 24, 2021, incorporated herein by reference in its entirety.

BACKGROUND

1. Technical Field

The disclosure relates to power supply systems, and more particularly to a power supply system using a plurality of battery strings.

2. Description of Related Art

Japanese Unexamined Patent Application Publication No. 2018-074709 (JP 2018-074709 A) discloses a control circuit for controlling a battery string. The battery string includes multiple battery circuit modules connected to each other. Each battery circuit module included in the battery string includes: a battery; a first switch connected in parallel with the battery; a second switch connected in series with the battery; and a first output terminal and a second output terminal to which the voltage of the battery is applied when the first switch is in an electrically disconnected state and the second switch is in an electrically connected state. The control circuit can adjust the output voltage of the battery string to a desired magnitude by controlling the first and second switches of each battery circuit module included in the battery string.

SUMMARY

JP 2018-074709 A discloses a power supply system that outputs direct-current (DC) power using such a battery string. However, J P 2018-074709 A does not at all consider outputting a power waveform (alternating-current (AC) power) using the battery string. JP 2018-074709 A does not at all consider performing energy management using the battery string.

The disclosure provides a power supply system capable of suitably performing energy management using battery strings.

A power supply system according to an aspect of the disclosure includes a first power supply circuit, a second power supply circuit, and a control device. The first power supply circuit includes a direct current battery string for direct current power and an inverter that converts direct current power output from the direct current battery string to alternating-current power, and the first power supply circuit is configured to output first alternating-current power with use of the direct-current battery string and the inverter. The second power supply circuit includes an alternating-current battery string for alternating-current power, and is configured to output second alternating-current power with use of the alternating-current battery string. The control device is configured to control the first power supply circuit and the second power supply circuit. The alternating-current battery string and the direct-current battery string are configured such that power transfer is performed between the alternating-current battery string and the direct-current battery string. Each of the alternating-current battery string and the direct-current battery string includes multiple battery circuit modules connected in series. Each of the battery circuit modules includes a battery, an output terminal that outputs a voltage of the battery, a first switch connected to the output terminal and connected in parallel with the battery, and a second switch connected in series with the battery. Each of the battery circuit modules is configured such that the voltage of the battery is applied to the output terminal when the first switch is in an electrically disconnected state and the second switch is in an electrically connected state. The control device is configured to adjust a state of charge (SOC) of each of the alternating-current battery string and the direct-current battery string by the power transfer between the alternating-current battery string and the direct-current battery string before performing requested energy management.

The above power supply system can easily output various kinds of alternating-current power using the first power supply circuit and the second power supply circuit. Specifically, the first power supply circuit can generate a power waveform (alternating-current power) from the direct-current power output from the direct-current battery string with the use of the inverter. The second power supply circuit can adjust the number of batteries connected to the circuit by controlling the first and second switches of each battery circuit module included in the alternating-current battery string. Different kinds of batteries (e.g., high capacity batteries and high power batteries) can be used for the alternating-current battery string and the direct-current battery string. The above configuration therefore makes it easier to increase the range of the voltage (V) that can be output and the range of power (kW) that can be output, and to increase the time during which power can be output. As described above, the above power supply system has a configuration that can easily respond to various energy management requests.

In the above power supply system, the SOC of each of the alternating-current battery string and the direct-current battery string is adjusted before the requested energy management is performed. Accordingly, each of the alternating-current battery string and the direct-current battery string is brought to a state suitable for the requested energy management, and the power supply system can easily respond to the requested energy management. Since the SOC adjustment is performed by the power transfer between the alternating-current battery string and the direct-current battery string, the SOC adjustment can be performed without receiving power supply from the outside.

The control device may be configured to: cause the direct-current battery string to perform power supply to the alternating-current battery string such that the state of charge of the alternating-current battery string becomes equal to or higher than a first state of charge value when the requested energy management is alternating-current power output and requested output power is smaller than a first reference value; and cause the second power supply circuit to output alternating-current power that meets a request after the state of charge of the alternating-current battery string becomes equal to or higher than the first state of charge value.

With the above configuration, the second power supply circuit can easily perform the low alternating-current power output (alternating-current power output in which output power is smaller than the first reference value) as requested. In the above configuration, the alternating-current battery string receives power supply from the direct-current battery string before the requested alternating-current power output is performed. This makes it easier for the alternating-current battery string to have a sufficient amount of charge (SOC) for the energy management (discharging).

The control device may be configured to adjust the state of charge of each of the alternating-current battery string and the direct-current battery string such that both the first power supply circuit and the second power supply circuit are able to output alternating-current power simultaneously for a first time or more, and then cause the first power supply circuit and the second power supply circuit to output alternating-current power that meets the request, when the requested energy management is the alternating-current power output and the requested output power is larger than the first reference value.

With the above configuration, the first power supply circuit and the second power supply circuit can easily perform the high alternating-current power output (alternating-current power output in which output power is larger than the first reference value) as requested. In the above configuration, the SOC of each of the alternating-current battery string and the direct-current battery string is adjusted before the requested alternating-current power output is performed. The SOC of the alternating-current battery string and the SOC of the direct-current battery string are adjusted in a balanced manner so that the first power supply circuit and the second power supply circuit are able to output alternating-current power (first alternating-current power and second alternating-current power) simultaneously for a sufficiently long time. For example, target SOCs of the alternating-current battery string and the direct-current battery string may be determined in consideration of power consumption of each battery string per unit time during the energy management. This makes it easier to perform energy management (high-power alternating-current power output) for a long time.

The control device may be configured to determine the first state of charge value and the first time using a period of the alternating-current power output that is requested. By performing the SOC adjustment based on the first state of charge value and first time thus determined, the power supply system can easily continue the requested alternating-current power output for the requested period.

The control device may be configured to: cause the alternating-current battery string to perform power supply to the direct-current battery string such that the state of charge of the alternating-current battery string becomes equal to or less than a second state of charge value when the requested energy management is alternating-current power input and requested input power is smaller than a second reference value; and input alternating-current power that meets a request to the second power supply circuit after the state of charge of the alternating-current battery string becomes equal to or less than the second state of charge value.

With the above configuration, the second power supply circuit can easily perform the low alternating-current power input (alternating-current power input in which input power is smaller than the second reference value) as requested. In the above configuration, the power output from the alternating-current battery string is input to the direct-current battery string before the requested alternating-current power input is performed. This makes it easier for the alternating-current battery string to have a sufficient capacity (empty capacity) for the energy management (charging).

The control device may be configured to adjust the state of charge of each of the alternating-current battery string and the direct-current battery string such that alternating-current power is able to be input to the first power supply circuit and the second power supply circuit simultaneously for a second time or more, and then input alternating-current power that meets the request to the first power supply circuit and the second power supply circuit, when the requested energy management is the alternating-current power input and the requested input power is larger than the second reference value.

With the above configuration, the first power supply circuit and the second power supply circuit can easily perform the high power alternating-current power input (alternating-current power input in which input power is larger than the second reference value) as requested. In the above configuration, the SOC of each of the alternating-current battery string and the direct-current battery string is adjusted before the requested alternating-current power input is performed. The SOC of the alternating-current battery string and the SOC of the direct-current battery string are adjusted in a balanced manner so that alternating-current power is able to be input to the first power supply circuit and the second power supply circuit simultaneously for a sufficiently long time. For example, target SOCs of the alternating-current battery string and the direct-current battery string may be determined in consideration of amount of charge of each battery string per unit time during the energy management. This makes it easier to perform energy management (high-power alternating-current power input) for a long time.

The control device may be configured to determine the second state of charge value and the second time using a period of the alternating-current power input that is requested. By performing the SOC adjustment based on the second state of charge value and second time thus determined, the power supply system can easily continue the requested alternating-current power input for the requested period.

A power density of each of the batteries included in the direct-current battery string may be higher than a power density of each of the batteries included in the alternating-current battery string. An energy density of each of the batteries included in the alternating-current battery string may be higher than an energy density of each of the batteries included in the direct-current battery string.

With the above configuration, various kinds of alternating-current power can be easily output using the first power supply circuit and the second power supply circuit. For example, power supply can be easily performed for a long time by using high capacity batteries (batteries with high energy density). High-rate power supply can be easily performed by using high power batteries (batteries with high power density).

Hereinafter, each battery included in the direct-current battery string is also referred to as "direct-current battery (DC battery)." The power density of each of the direct-current batteries may be 1000 W/kg or more, 1500 W/kg or more and less than 5000 W/kg, or 5000 W/kg or more. The energy density of each of the direct-current batteries may be less than 300 Wh/kg, less than 100 Wh/kg, or 50 Wh/kg or more and less than 500 Wh/kg.

Hereinafter, each battery included in the alternating-current battery string is also referred to as "alternating-current battery (AC battery)." The energy density of each of the alternating-current batteries may be 300 Wh/kg or more, 500 Wh/kg or more and less than 1000 Wh/kg, or 1000 Wh/kg or more. The power density of each of the alternating-current batteries may be less than 1000 W/kg, or 300 W/kg or more and less than 1000 W/kg.

In any of the power supply systems described above, each of the first power supply circuit and the second power supply circuit may be electrically connected to an electrical wire connecting a building and an external power supply that supplies power to the building. The energy management may be adjustment of power of the external power supply.

With the above configuration, alternating-current power can be supplied to the building from each of the first power supply circuit and the second power supply circuit. Since each of the alternating-current batteries and the direct-current batteries can be charged with the power from the external power supply, each of the first power supply circuit and the second power supply circuit can store power as necessary. The power supply system may function as an emergency power source for the building. The external power supply may be a power grid (i.e., an electrical power grid).

Any of the power supply systems described above may further include an insulation filter located between the first power supply circuit and the electrical wire. The inverter may be a reused product that was used for another purpose.

In a mode in which the inverter is a reused product, a desired alternating-current power waveform is not always obtained by the inverter. In the above configuration, the insulation filter is therefore provided between the first power supply circuit and the electrical wire. The use of the insulation filter makes it easier to obtain a desired alternating-current power waveform and to reduce noise contained in output (alternating-current power) of the first power supply circuit.

For example, a reused product that was used as an inverter for traveling in an electrified vehicle (xEV) (that is, an inverter removed from an xEV after use) can be used as the inverter. The inverter for traveling is, for example, an inverter that drives a motor for traveling in an xEV (i.e., a motor for causing an xEV to travel). Electrified vehicles (xEVs) are vehicles that use electric power as all or part of a power source. Electrified vehicles (xEVs) include battery electric vehicles (BEVs), plug-in hybrid electric vehicles (PHEVs), and fuel cell electric vehicles (FCEVs).

The first power supply circuit may include a first drive circuit configured to drive the first switch and the second switch included in the direct-current battery string, and a first control circuit configured to send a signal for driving each of the first switch and the second switch to the first drive circuit according to a command from the control device. The second power supply circuit may include a second drive circuit configured to drive the first switch and the second switch included in the alternating-current battery string, and a second control circuit configured to send a signal for driving each of the first switch and the second switch to the second drive circuit according to a command from the control device.

With the above configuration, the alternating-current battery string and the direct-current battery string can be easily suitably controlled by the first control circuit and the second control circuit.

In the above power supply system, the inverter may be a three-phase inverter. The control device may be configured to send a command for controlling the direct-current battery string to the first control circuit and control the inverter such that three-phase alternating-current power is output from the first power supply circuit. The alternating-current battery string may include a U-phase battery string, a V-phase battery string, and a W-phase battery string that are Y-connected. The control device may be configured to send a command for controlling the U-phase battery string, the V-phase battery string, and the W-phase battery string to the second control circuit such that three-phase alternating-current power is output from the second power supply circuit.

With the above configuration, the three-phase alternating-current power can be output from each of the first power supply circuit and the second power supply circuit. The voltage of the three-phase alternating-current power may be 190 V or more and 300 V or less, or may be 200 V.

The disclosure provides the power supply system capable of suitably performing energy management using the battery strings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described in detail with reference to the drawings. The same or corresponding portions are denoted by the same signs throughout the drawings, and description thereof will not be repeated. Hereinafter, a string control unit is referred to as "SCU." A group control unit is referred to as "GCU." An alternating-current is sometimes referred to as "AC," and a direct-current is sometimes referred to as "DC."

Figure 1:
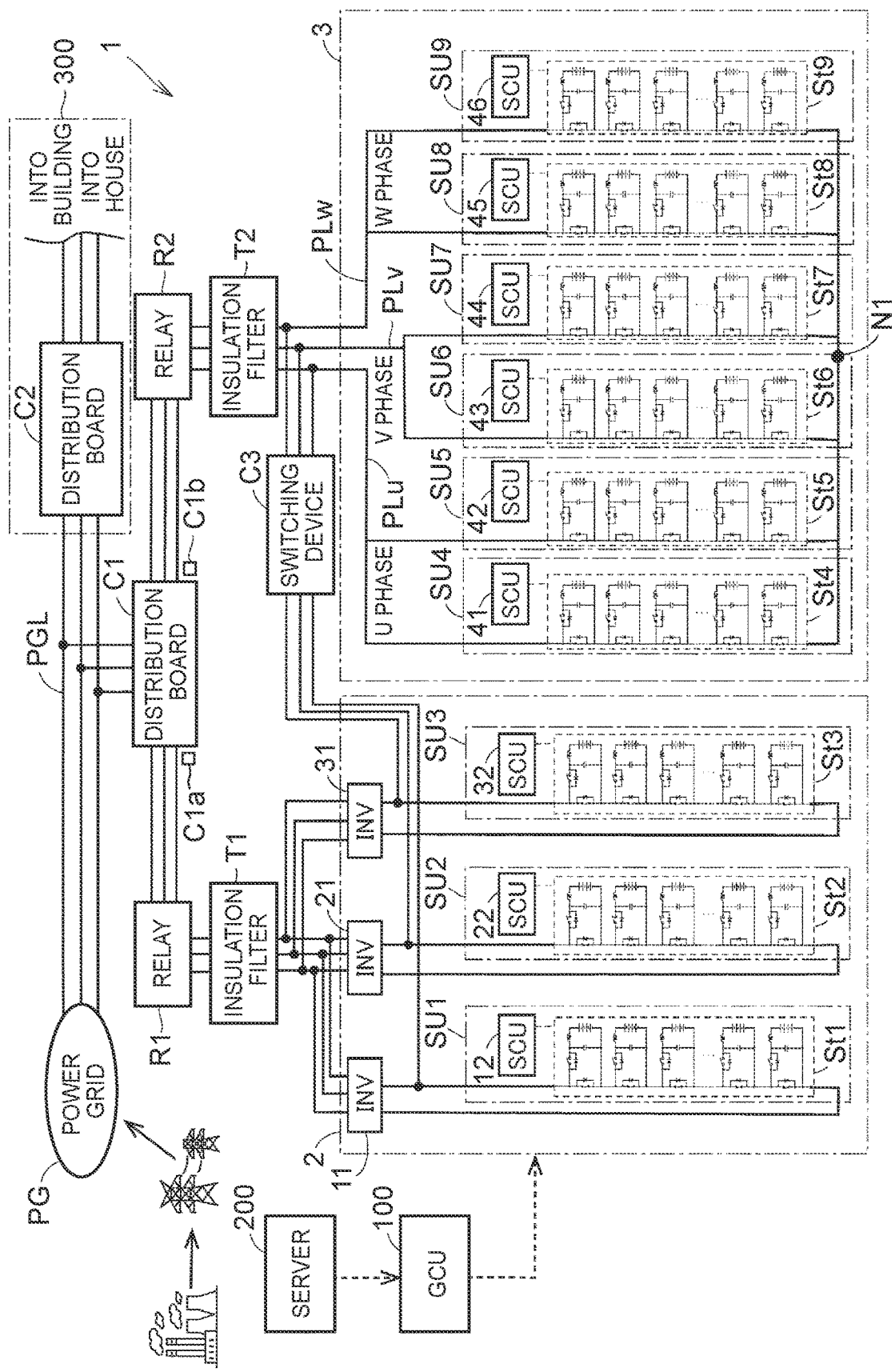
FIG. 1 shows a configuration of a power supply system according to an embodiment of the disclosure.

FIG. 1 shows a configuration of a power supply system according to the embodiment. A power supply system 1 includes a first power supply circuit 2, a second power supply circuit 3, insulation filters T1, T2, relays R1, R2, a distribution board C1, a switching device C3, and a GCU 100. The GCU 100 is an example of the "control device" according to the disclosure. The GCU 100 may be a computer. The GCU 100 includes, for example, a processor, a random access memory (RAM), and a storage device (none of which are shown). The GCU 100 performs various processes by the processor executing programs stored in the storage device. However, the various processes of the GCU 100 need not necessarily be performed by software, and may be performed by dedicated hardware (electronic circuit). In the present embodiment, the power supply system 1 is applied to a building 300 such as a house, school, hospital, commercial facility, or train station.

A power grid (i.e., an electrical power grid) PG supplies electric power to the building 300 through electrical wires PGL. The power grid PG is a power network constituted by power transmission and distribution equipment. A plurality of power plants is connected to the power grid PG. Electric power is supplied from the power plants to the power grid PG. In the present embodiment, an electric power company maintains and manages the power grid PG (commercial power supply). The electric power company corresponds to a transmission system operator (TSO) (grid operator). The power grid PG supplies three-phase AC power to the building 300. The power grid PG is an example of the "external power source" according to the disclosure. A server 200 manages the supply and demand situation of the power grid PG. The server 200 is configured to communicate with the GCU 100. In the present embodiment, the server 200 belongs to the electric power company. However, the disclosure is not limited to this, and the server 200 may be a server that belongs to an aggregator, or may be a server that trades electricity in an electric power market (e.g., a supply and demand adjustment market, i.e., an electricity balancing market).

Each of the first power supply circuit 2 and the second power supply circuit 3 is configured to supply and receive electric power to and from the power grid PG. Each of the first power supply circuit 2 and the second power supply circuit 3 sometimes receives electric power from the power grid PG and sometimes supplies electric power to the power grid PG. Each of the first power supply circuit 2 and the second power supply circuit 3 is electrically connected to the electrical wires PGL (electrical wires connecting the power grid PG and the building 300) via the distribution board C1. The relay R1 and the insulation filter T1 are provided between the electrical wires PGL and the first power supply circuit 2 (more specifically, between the distribution board C1 and the first power supply circuit 2). The relay R2 and the insulation filter T2 are provided between the electrical wires PGL and the second power supply circuit 3 (more specifically, between the distribution board C1 and the second power supply circuit 3).

The distribution board C1 includes an earth leakage circuit breaker and/or a breaker. The distribution board C1 is provided with power sensors C1a, C1b. The power sensor C1a includes a current sensor that detects a current (input and output current) flowing between the first power supply circuit 2 and the electrical wires PGL, and a voltage sensor that detects an input and output voltage of the first power supply circuit 2. The power sensor C1b includes a current sensor that detects a current (input and output current) flowing between the second power supply circuit 3 and the electrical wires PGL, and a voltage sensor that detects an input and output voltage of the second power supply circuit 3. The power sensors C1a, C1b output their detection results to the GCU 100. The distribution board C1 may further include an electricity meter (not shown).

A distribution board C2 installed in the building 300 is configured to receive electric power supplied from each of the power grid PG and the power supply system 1. The distribution board C2 is connected to indoor wires and distributes power supplied from at least one of the power grid PG and the power supply system 1 to the indoor wires.

The first power supply circuit 2 includes battery strings St1, St2, and St3, inverters 11, 21, and 31, and SCUs 12, 22, and 32. The second power supply circuit 3 includes battery strings St4 to St9 and SCUs 41 to 46. Each battery string St in the first power supply circuit 2 and the second power supply circuit 3 forms a sweep unit SU.

Figure 2:
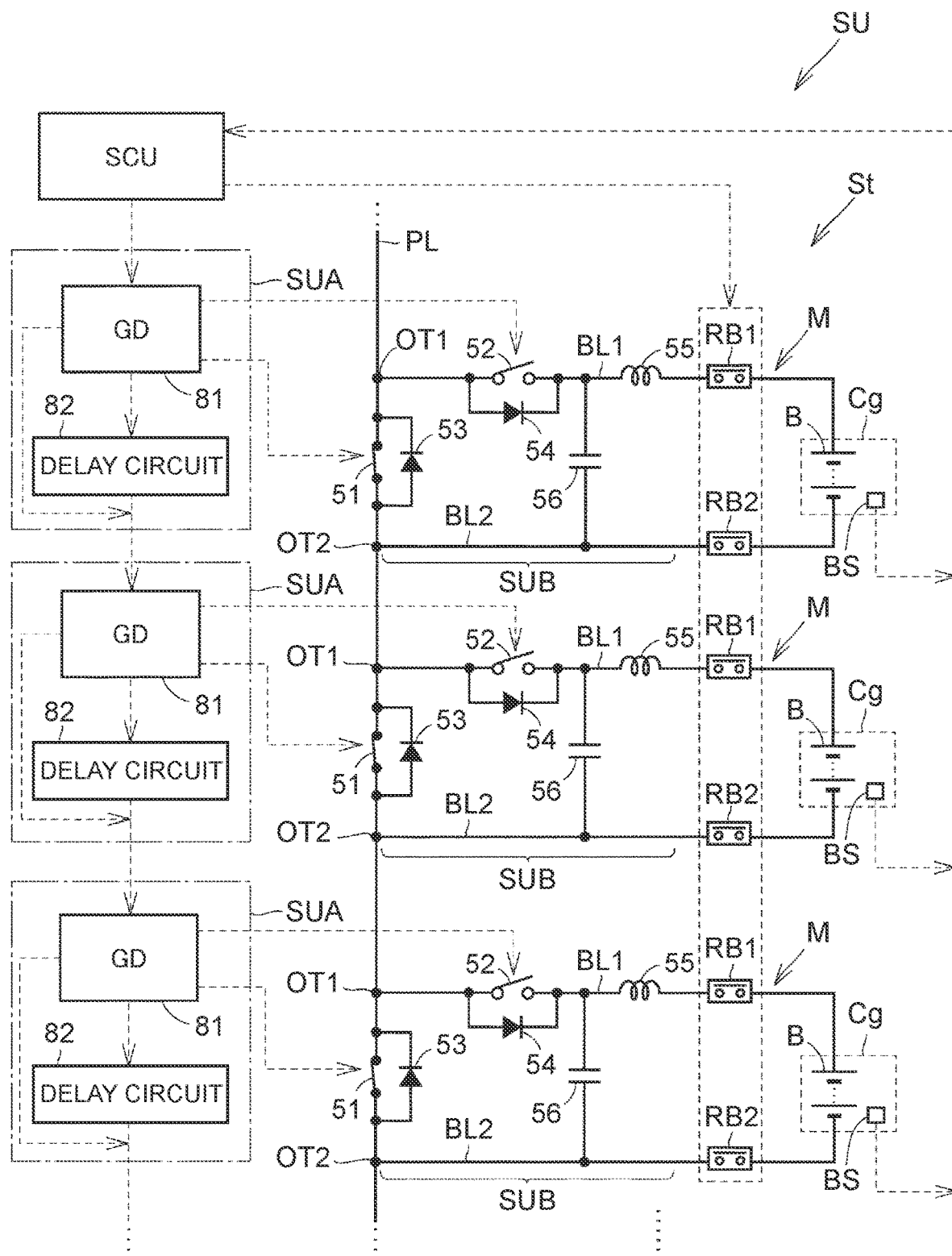
FIG. 2 shows a configuration of each sweep unit included in the power supply system shown in FIG. 1.

FIG. 2 shows a configuration of the sweep unit SU. Referring to FIG. 2 together with FIG. 1, in the power supply system 1 according to the present embodiment, the sweep units SU are mounted on each of the first power supply circuit 2 and the second power supply circuit 3. The sweep unit SU is a module including a battery string St (corresponding to the battery strings St1 to St9 shown in FIG. 1); a plurality of drive circuits SUA (not shown in FIG. 1) that drives switches (SW 51 and SW 52 that will be described later) in the battery string St; and an SCU (corresponding to the SCUs 12, 22, 32 and 41 to 46 shown in FIG. 1) that sends a control signal to the drive circuits SUA. The drive circuits SUA may be formed on one substrate and integrated. The sweep unit SU may be one circuit board.

The battery string St includes multiple battery circuit modules M connected in series. In the present embodiment, the battery string St includes about 20 battery circuit modules M. However, the battery string St may include any number of battery circuit modules M. The battery string St may include 5 to 50 battery circuit modules M, or may include 100 or more battery circuit modules M. In the present embodiment, each battery string St in the first power supply circuit 2 and the second power supply circuit 3 includes the same number of battery circuit modules M. However, the numbers of battery circuit modules M in battery strings St may be different from each other.

Each battery circuit module M includes a power circuit SUB and a cartridge Cg. The cartridge Cg includes a battery B and a monitoring unit BS. The battery circuit module M including the battery B is formed by connecting the power circuit SUB and the battery B. The drive circuit SUA is provided for each battery circuit module M. The drive circuit SUA is configured to drive the switches included in the battery circuit module M (more specifically, SW 51 and SW 52). The battery B will be described in detail later. In the present embodiment, different kinds of batteries are used for the first power supply circuit 2 and the second power supply circuit 3.

As shown in FIG. 2, each battery circuit module M further includes circuit breakers RB1, RB2 (hereinafter referred to as "circuit breakers RB" when not individually identified). The power circuit SUB and the cartridge Cg are connected to each other via the circuit breakers RB1, RB2. The SCU is configured to switch the connection state between the power circuit SUB and the cartridge Cg (i.e., switch the connection state between an electrically connected state and an electrically disconnected state) by controlling ON and OFF of each circuit breaker RB according to a control command from the GCU 100. The circuit breaker RB may be an electromagnetic mechanical relay. The circuit breaker RB may be configured to be manually turned on and off by a user.

In the present embodiment, the cartridge Cg is detachable from the power circuit SUB. For example, the user may remove the cartridge Cg from the power circuit SUB when the circuit breakers RB1, RB2 are in the OFF state (electrically disconnected state). Since the battery string St can operate even when there is an empty cartridge, the user can easily increase or decrease the number of cartridges Cg in the battery string St. The battery string St is suitable for battery reuse.

The monitoring unit BS of the cartridge Cg is configured to detect the state of the battery B (e.g., voltage, current, and temperature) and output the detection results to the SCU. The monitoring unit BS includes a voltage sensor that detects the voltage of the battery B, a current sensor that detects the current of the battery B, and a temperature sensor that detects the temperature of the battery B. The monitoring unit BS may be a battery management system (BMS) having a state of charge (SOC) estimation function, a state of health (SOH) estimation function, a battery voltage equalization function, a diagnostic function, and a communication function, in addition to the above sensor functions. The SCU acquires the state of each battery B (e.g., temperature, current, voltage, SOC, and internal resistance) based on the output of each monitoring unit BS, and outputs the acquired state of each battery B to the GCU 100. The SOC indicates the remaining capacity of the battery B. For example, the SOC is the ratio of the available capacity to the capacity in the fully charged state and varies in a range of 0% to 100%.

The battery circuit modules M included in the battery string St are connected by a common electrical wire PL. The electrical wire PL includes output terminals OT1, OT2 of each battery circuit module M. The output terminal OT2 of each battery circuit module M is connected to the output terminal OT1 of its adjacent battery circuit module M. The battery circuit modules M included in the battery string St are thus connected to each other.

The power circuit SUB includes a first switching element 51 (hereinafter referred to as "SW 51"), a second switching element 52 (hereinafter referred to as "SW 52"), a first diode 53, a second diode 54, and a choke coil 55, a capacitor 56, and output terminals OT1, OT2. Each of the SW 51 and the SW 52 is driven by the drive circuit SUA. The SW 51 and the SW 52 according to the present embodiment are an example of the "first switch" and the "second switch" according to the disclosure, respectively.

The SW 51, the capacitor 56, and the battery B are connected in parallel between the output terminals OT1, OT2 of the power circuit SUB. The SW 51 is located on the electrical wire PL and is configured to switch the connection state between the output terminal OT1 and the output terminal OT2 (i.e., switch the connection state between the electrically connected state and the electrically disconnected state). The output terminal OT1 is connected to a positive electrode of the battery B via an electrical wire BL1, and the output terminal OT2 is connected to a negative electrode of the battery B via an electrical wire BL2. The circuit breakers RB1, RB2 are provided on the electrical wires BL1, BL2, respectively. The SW 52 and the choke coil 55 are also provided on the electrical wire BL1. In the battery circuit module M, a voltage of the battery B is applied between the output terminals OT1, OT2 when the SW 52 connected in series with the battery B is in the ON state (electrically connected state) and the SW 51 connected in parallel with the battery B is in the OFF state (electrically disconnected state).

The capacitor 56 connected to the electrical wires BL1, BL2 is provided between the battery B and the output terminals OT1, OT2. One end of the capacitor 56 is connected to the electrical wire BL1 at a position between the SW 52 and the choke coil 55. The capacitor 56 smooths the voltage of the battery B and outputs the smoothed voltage between the output terminals OT1, OT2.

Each of the SW 51 and the SW 52 is, for example, a field effect transistor (FET). The first diode 53 and the second diode 54 are connected in parallel with the SW 51 and the SW 52, respectively. The SW 52 is located between the output terminal OT1 and the choke coil 55. The choke coil 55 is located between the SW 52 and the positive electrode of the battery B. The battery B, the choke coil 55, and the capacitor 56 form an RLC filter. The RLC filter performs current leveling. Each of the SW 51 and the SW 52 is not limited to the FET and may be a switch other than the FET.

The SCU sends a signal for driving each of the SW 51 and the SW 52 to the drive circuit SUA according to a command from the GCU 100. Specifically, the SCU generates a gate signal according to a control command from the GCU 100. This gate signal corresponds to the signal for driving each of the SW 51 and the SW 52 according to a command from the GCU 100. The SCU then sends the gate signal to the drive circuit SUA. The drive circuit SUA includes a gate driver (GD) 81 that drives the SW 51 and the SW 52 according to the gate signal, and a delay circuit 82 that delays the gate signal. Each of the SW 51 and the SW 52 included in the battery circuit module M is controlled to be in the ON state or the OFF state according to the gate signal.

Figure 3:
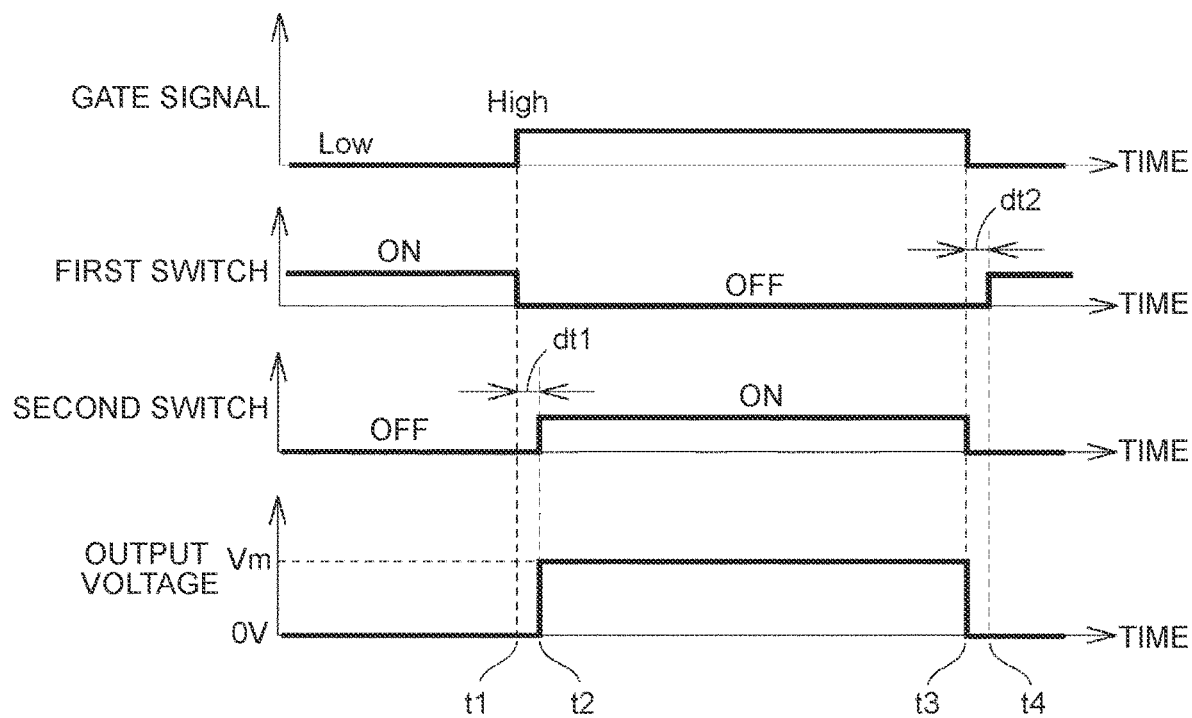
FIG. 3 is a timing chart showing an example of the operation of each battery circuit module that is controlled by a gate signal in the sweep unit shown in FIG. 2.

FIG. 3 is a timing chart showing an example of the operation of the battery circuit module M that is controlled by the gate signal. In the present embodiment, a rectangular wave signal is used as the gate signal for driving the SW 51 (first switch) and the SW 52 (second switch). "Low" and "High" of the gate signal shown in FIG. 3 mean L level and H level of the gate signal (rectangular wave signal), respectively. The "output voltage" signifies a voltage that is output between the output terminals OT1, OT2.

In the initial state of the battery circuit module M, no gate signal is input to the drive circuit SUA (gate signal=L level), and the SW 51 and the SW 52 are in the ON state and the OFF state, respectively. When the gate signal is input to the drive circuit SUA, the GD 81 drives the SW 51 and the SW 52 according to the received gate signal. In the example shown in FIG. 3, the gate signal rises from L level to H level at time t1, and the SW 51 switches from the ON state to the OFF state at the same time as the rise of the gate signal. The SW 52 switches from the OFF state to the ON state at time t2 delayed by a predetermined amount of time (hereinafter referred to as "dt1") from the rise of the gate signal. As a result, the battery circuit module M switches to the operating state. Hereinafter, the period of dt1 from the rise of the gate signal is sometimes referred to as "first delay period."

Figure 4:
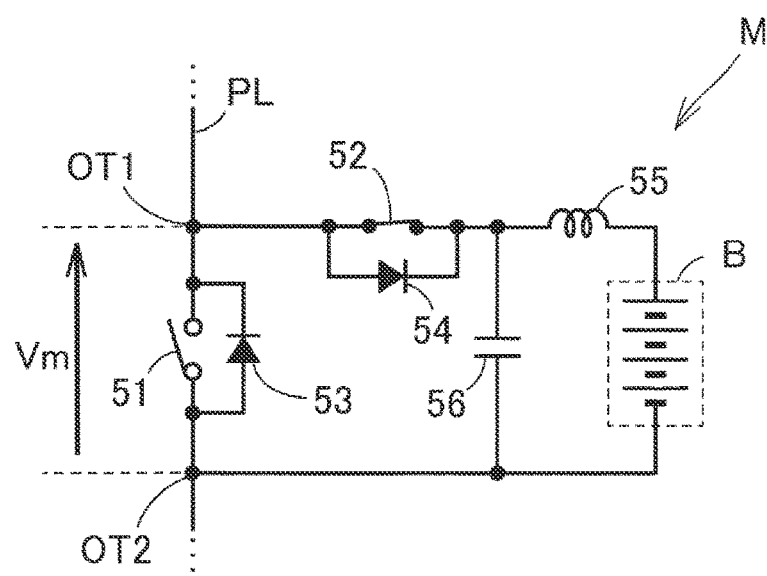
FIG. 4 shows the battery circuit module in an operating state in the sweep unit shown in FIG. 2.

FIG. 4 shows the battery circuit module M in the operating state. Referring to FIG. 4, in the battery circuit module M in the operating state, the voltage of the battery B is applied between the output terminals OT1, OT2 when the SW 51 is in the OFF state and the SW 52 is in the ON state. As the voltage of the battery B is applied between the output terminals OT1, OT2 via the capacitor 56, a voltage Vm is output between the output terminals OT1, OT2.

Referring back to FIG. 3, when the gate signal falls from H level to L level at time t3, the SW 52 switches from the ON state to the OFF state at the same time as the fall of the gate signal. As a result, the battery circuit module M switches to the stopped state. In the battery circuit module M in the stopped state, the voltage of the battery B is not applied between the output terminals OT1, OT2 as the SW 52 is in the OFF state. The SW 51 then switches from the OFF state to the ON state at time t4 delayed by a predetermined amount of time (hereinafter referred to as "dt2") from the fall of the gate signal. The values dt1, dt2 may be the same, or may be different from each other. In the present embodiment, dt1 and dt2 are 100 nanoseconds. However, dt1 and dt2 can be set as desired.

Hereinafter, the period of dt2 from the fall of the gate signal is sometimes referred to as "second delay period." The period from the end of the second delay period until the battery circuit module M switches to the operating state is sometimes referred to as "stop period."

Figure 5:
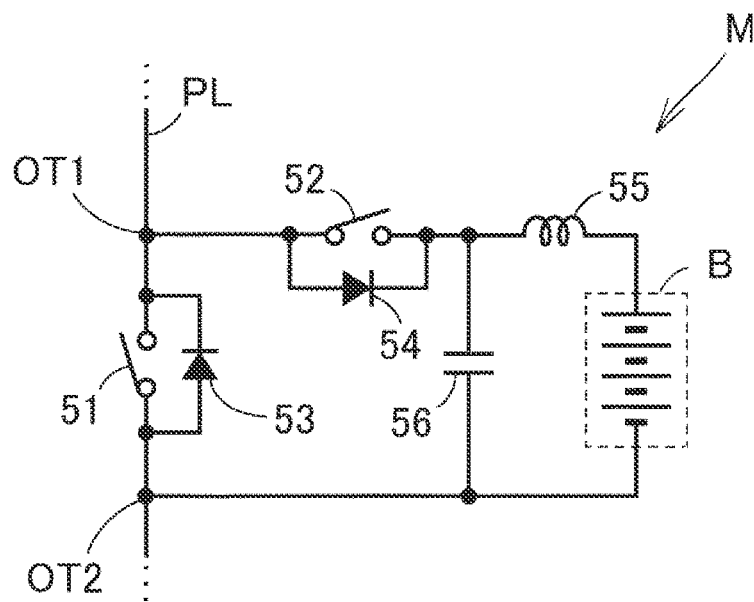
FIG. 5 shows the state of the battery circuit module during a delay period in the sweep unit shown in FIG. 2.

FIG. 5 shows the state of the battery circuit module M during the delay period. As shown in FIG. 5, both the SW 51 and the SW 52 are in the OFF state during each of the first delay period and the second delay period.

Figure 6:
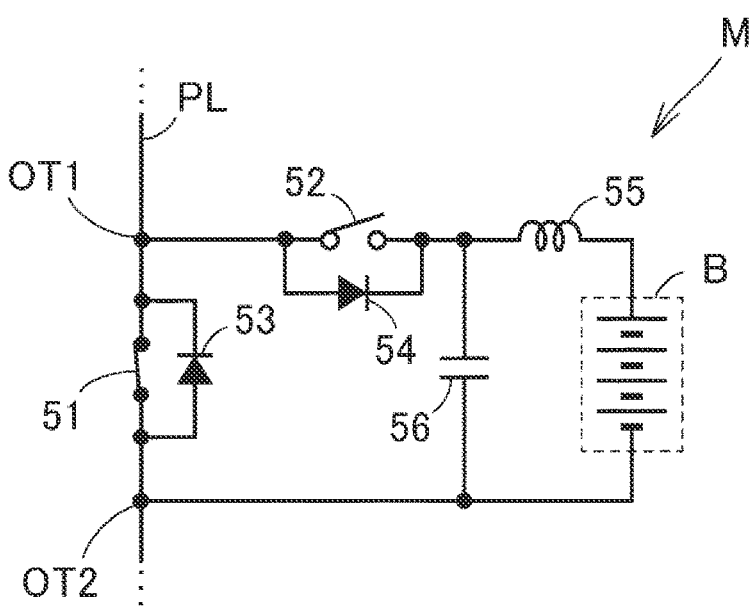
FIG. 6 shows the state of the battery circuit module during a stop period in the sweep unit shown in FIG. 2.

FIG. 6 shows the state of the battery circuit module M during the stop period. As shown in FIG. 6, the SW 51 is in the ON state and the SW 52 is in the OFF state during the stop period, as in the initial state.

The battery circuit module M is in the stopped state during each of the delay period and the stop period. In the battery circuit module M in the stopped state, no voltage is applied between the output terminals OT1, OT2. Providing the first delay period and the second delay period reduces the possibility that both the SW 51 and the SW 52 may be in the ON state at the same time (that is, the possibility that the battery circuit module M may be short-circuited).

The battery string St is configured to output a voltage in a range of 0 V to the total voltage of the batteries B included in the battery string St. In the sweep unit SU, the SCU can control the output voltage of the battery string St by adjusting the number of battery circuit modules M that are in the operating state at the same time. In the present embodiment, the SCU controls the voltage of the battery string St by sweep control.

Figure 7:
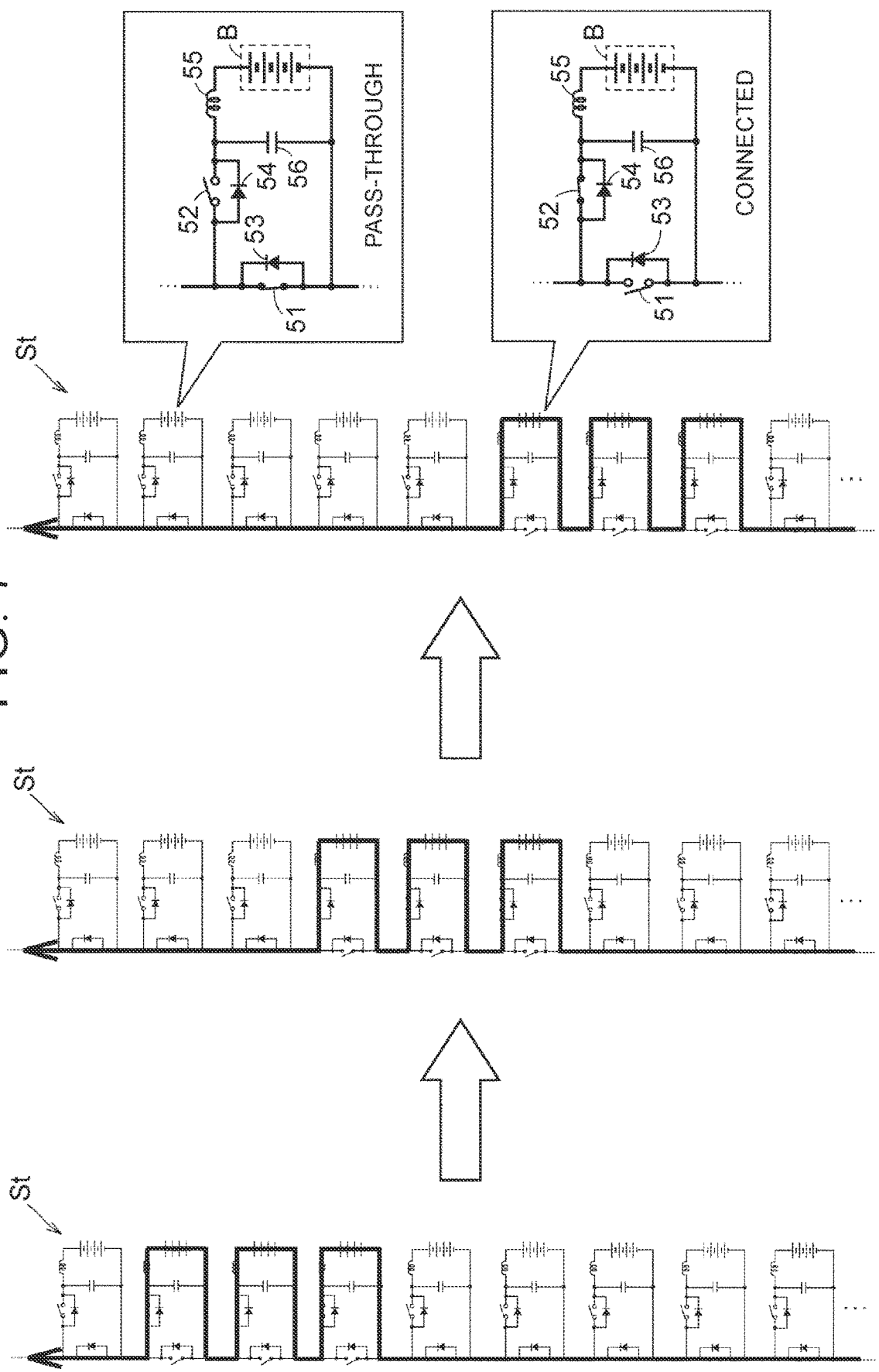
FIG. 7 illustrates an example of sweep control that is performed in the sweep unit shown in FIG. 2.

FIG. 7 illustrates an example of the sweep control. Referring to FIG. 7 together with FIGS. 2 and 3, in the battery string St subjected to the sweep control, a predetermined number of batteries B (three in the example shown in FIG. 7) are connected to the circuit, and the remaining batteries B are disconnected from the circuit. In the battery circuit module M, when the SW 51 is in the OFF state and the SW 52 is in the ON state, the battery B is connected to the circuit and the voltage of the battery B is applied to the circuit. In the battery circuit module M, when the SW 51 is in the ON state and the SW 52 is in the OFF state, the battery B is disconnected from the circuit, and the voltage of the battery B is not applied to the circuit (i.e., the battery B is in a pass-through state). In the sweep control, the predetermined number of batteries B (three in the example shown in FIG. 7) are always simultaneously connected to the circuit while the individual batteries B connected to the circuit are switched. The sweep unit SU performs the sweep control by sending the gate signal shown in FIG. 3 from one end (upstream end) to the other end (downstream end) of the battery string St while delaying it. The gate signal is delayed by the delay circuit 82. The GD 81 drives the SW 51 and the SW 52 according to the gate signal. Therefore, the battery B located downstream is connected to the circuit later than the battery B located upstream. For example, as shown in FIG. 7, the currents and SOCs are equalized among the batteries B in the battery string St by sequentially connecting these batteries B included in the battery string St. The GCU 100 sets the delay time of each delay circuit 82. The delay time may be set to zero (no delay). For example, when the delay times of all the delay circuits 82 in the sweep unit SU are set to zero, all the batteries B are switched to the connected state or the pass-through state at the same time.

The GCU 100 may control the input and output of the battery string St based on the period and duty cycle (ratio of the H level duration to the period) of the gate signal. The GCU 100 can select between connection and disconnection for each cartridge Cg (battery B) in the battery string St. A disconnection instruction is sent from the GCU 100 to the SCU. The GD 81 instructed by the SCU to disconnect the corresponding battery B from the circuit may maintain the pass-through state of the corresponding battery B regardless of the gate signal. The SCU may disconnect the battery B from the circuit by switching each of the circuit breakers RB1, RB2 to the OFF state. The GCU 100 may adjust the load sharing of each battery B according to the capacity (or SOC) of each battery B. The GCU 100 may prohibit discharge or charge of a specific battery B based on the SOC of each battery B. For example, the GCU 100 may prohibit discharge of the battery B that can be overdischarged, or may prohibit charge of the battery B that can be overcharged. The GCU 100 may perform a degradation diagnosis using a constant load on a predetermined battery B in the battery string St. The GCU 100 may keep a faulty battery B (or a battery B with a high degree of degradation) disconnected from the circuit (see FIG. 6) in order to prohibit the use of that battery B.

The number of sweep units SU included in each of the first power supply circuit 2 and the second power supply circuit 3 shown in FIG. 1 corresponds to the number of battery strings St included in each of the first power supply circuit 2 and the second power supply circuit 3. Specifically, the first power supply circuit 2 includes three sweep units SU (hereinafter referred to as "SU1," "SU2," and "SU3") corresponding to the battery strings St1 to St3. The SCUs 12, 22, and 32 together with the battery strings St1, St2, and St3 form the sweep units SU1, SU2, and SU3, respectively. The battery string St, drive circuits SUA, and SCU of each sweep unit SU in the first power supply circuit 2 are an example of the "direct-current battery string," the "first drive circuit," and the "first control circuit" according to the disclosure, respectively. The second power supply circuit 3 includes six sweep units SU (hereinafter referred to as "SU4" to "SU9") corresponding to the battery strings St4 to St9. The SCUs 41, 42, 43, 44, 45, and 46 together with the battery strings St4, St5, St6, St7, St8, and St9 form the sweep units SU4, SU5, SU6, SU7, SU8, and SU9, respectively. The battery string St, drive circuits SUA, and SCU of each sweep unit SU in the second power supply circuit 3 are an example of the "alternating-current battery string," the "second drive circuit," and the "second control circuit" according to the disclosure, respectively.

By controlling the sweep units SU1 to SU3, the GCU 100 can cause each of the battery strings St1 to St3 to output DC power with a desired voltage (power with a constant voltage). The GCU 100 may determine the output voltage (DC power voltage) of each of the battery strings St1 to St3 based on information acquired from the user or the server 200. By controlling the sweep units SU4 to SU9, the GCU 100 can cause each of the battery strings St4 to St9 to output AC power (power whose voltage changes periodically in magnitude) with a desired voltage waveform. The GCU 100 may determine the output voltage waveform of each of the battery strings St4 to St9 based on information acquired from the user or the server 200. The user may input a power supply condition and/or a charge condition to the GCU 100.

In the present embodiment, high power batteries are used as the DC batteries (batteries B) in the DC battery strings (battery strings St1, St2, and St3). Specifically, nickel metal hydride secondary batteries with a power density of 1500

W/kg or more and less than 5000 W/kg and an energy density of 50 Wh/kg or more and less than 500 Wh/kg are used as the DC batteries. High capacity batteries are used as the AC batteries (batteries B) in the AC battery strings (battery strings St4 to St9). Specifically, lithium-ion secondary batteries with a power density of 300 W/kg or more and less than 1000 W/kg and an energy density of 500 Wh/kg or more and less than 1000 Wh/kg are used as the AC batteries. However, different kinds of lithium-ion batteries are used in the battery strings St4, St6, and St8 and in the battery strings St5, St7, and St9 (in other words, the kind of the lithium-ion batteries used in the battery strings St4, St6, and St8 is different from the kind of the lithium-ion batteries used in the battery strings St5, St7, and St9). Ternary (lithium nickel manganese cobalt oxide (NMC)) lithium-ion batteries are used as the batteries B in the battery strings St4, St6, and St8. Lithium iron phosphate (LFP) lithium-ion batteries are used as the batteries B in the battery strings St5, St7, and St9.

However, the kind (e.g., structure and material) and characteristics (e.g., power density and energy density) of the battery are not limited to those described above, and can be changed as appropriate. For example, a power (high power) battery and an energy (high capacity) battery may be defined based on a Ragone plot with the power density (W/kg) on the ordinate and the energy density (Wh/kg) on the abscissa. A battery classified as a high power battery by the Ragone plot may be used as a DC battery, and a battery classified as a high capacity battery by the Ragone plot may be used as an AC battery. A plurality of kinds of secondary batteries may be used in one battery string St. The battery may be a lithium-air battery, a lead-acid battery, a sodium-sulfur (NAS) battery, a redox flow battery, or an all-solid-state battery. The battery B may be manufactured by reusing secondary batteries that were used in xEVs, specifically by connecting the secondary batteries that were used in xEVs in series.

In the first power supply circuit 2, the DC power output from the battery strings St1, St2, and St3 is input to the inverters 11, 21, and 31, respectively. Hereinafter, the configuration of the inverters included in the first power supply circuit 2 will be described with reference to FIGS. 1 and 8. Since the inverters 11, 21, and 31 have the same configuration, the configuration of the inverter 11 will be described below as a representative example.

Figure 8:
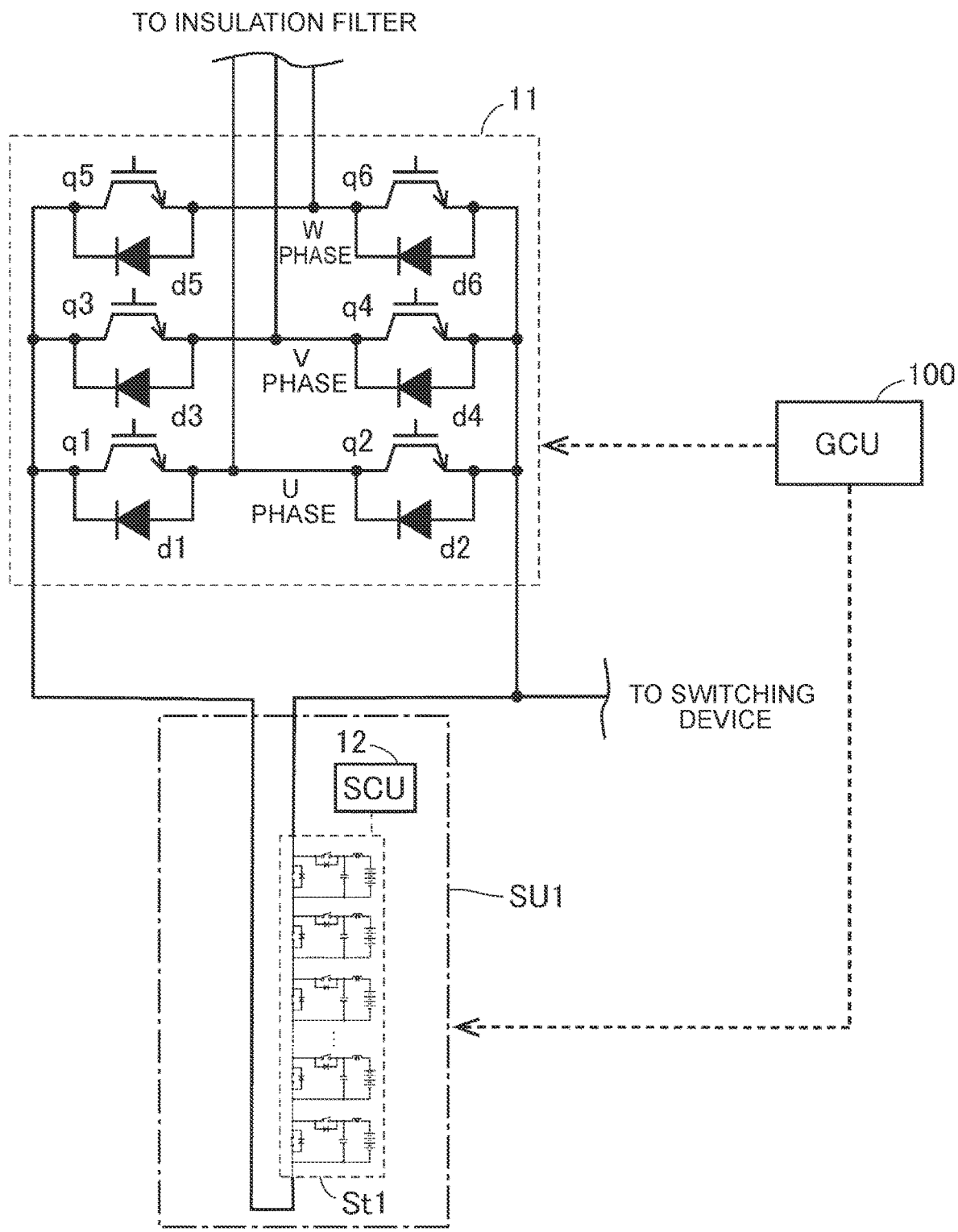
FIG. 8 shows a detailed configuration of an inverter shown in FIG. 1.

FIG. 8 shows a configuration of the inverter 11 included in the first power supply circuit 2. Referring to FIG. 8 together with FIG. 1, the inverter 11 is a three-phase inverter, and includes switching elements q1, q2 connected in series with a U-phase arm, switching elements q3, q4 connected in series with a V-phase arm, and switching elements q5, q6 connected in series with a W-phase arm. Each of diodes d1 to d6 is connected in antiparallel between the collector and the emitter of a corresponding one of the switching elements q1 to q6. In the present embodiment, a three-phase inverter that was used to drive a three-phase synchronous motor of an xEV is reused as the inverter 11. The inverter 11 is configured to convert power in both directions.

An intermediate point of each phase arm of the inverter 11 is connected to the insulation filter T1 and is further connected to the electrical wires PGL via the relay R1 and the distribution board C1 (see FIG. 1). The switching elements q1 to q6 of the inverter 11 are controlled by control commands from the GCU 100. Each switching element of the inverter 11 is turned ON or OFF by, for example, pulse width modulation (PWM) control.

The inverter 11 converts the DC power output from the battery string St1 to AC power (three-phase AC power) and supplies it to the electrical wires PGL. The inverter 11 functions as a DC-to-AC converter circuit. The AC power output from the inverter 11 is supplied to the electrical wires PGL via the insulation filter T1, the relay R1, and the distribution board C1. By controlling the SWs 51, 52 of each battery circuit module M in the battery string St1, the sweep unit SU1 can output power from any one or more of the batteries B in the battery string St1. The sweep unit SU1 outputs power from designated one or more batteries B to the inverter 11 according to, for example, a command from the GCU 100. The sweep units SU2, SU3 also output power from the batteries B in the battery strings St2, St3 to the inverters 21, 31, respectively, in a manner similar to that described above. The GCU 100 is configured to send commands for controlling the battery strings St1, St2, and St3 to the SCUs 12, 22, and 32 and control the inverters 11, 21, and 31 so that three-phase AC power is output from the first power supply circuit 2.

The inverter 11 converts the AC power (three-phase AC power) input from the power grid PG through the electrical wires PGL, the distribution board C1, the relay R1, and the insulation filter T1 to DC power, and outputs the DC power to the battery string St1. The sweep unit SU1 can charge the batteries B in the battery string St1 using the DC power supplied from the inverter 11. At this time, the GCU 100 controls the sweep unit SU1 so that the voltage of the battery string St1 becomes slightly lower than the AC voltage supplied from the power grid PG. By controlling the SWs 51, 52 of each battery circuit module M in the battery string St1, the sweep unit SU1 can charge any one or more of the batteries B in the battery string St1. The sweep unit SU1 charges designated one or more batteries B according to, for example, a command from the GCU 100. The sweep units SU2, SU3 also charge the batteries B in the battery strings St2, St3, respectively, in a manner similar to that described above. The GCU 100 is configured to send commands for controlling the battery strings St1, St2, and St3 to the SCUs 12, 22, and 32 and control the inverters 11, 21, and 31 so that predetermined batteries B in the battery strings St1, St2, and St3 are charged.

As shown in FIG. 1, the inverters 11, 21, and 31 are connected in parallel with the insulation filter T1. Specifically, intermediate points (see FIG. 8) of the three phase arms of the inverters 11, 21, and 31 are connected to the insulation filter T1 by electrical wires. The first power supply circuit 2 outputs three-phase AC power (first AC power) using the battery strings St1, St2, and St3 that are connected in parallel and inverters 11, 21, and 31. In the present embodiment, the first power supply circuit 2 includes three DC battery strings (battery strings St1, St2, and St3) connected in parallel. As the number of DC battery strings connected in parallel becomes greater, it becomes easier to stabilize the AC power waveform output from the first power supply circuit 2. The number of DC battery strings in the first power supply circuit 2 is not limited to three, and can be changed as appropriate. The first power supply circuit 2 may include one DC battery string, or may include four or more battery strings. The first power supply circuit 2 may be configured to output single-phase AC power.

Figure 9:
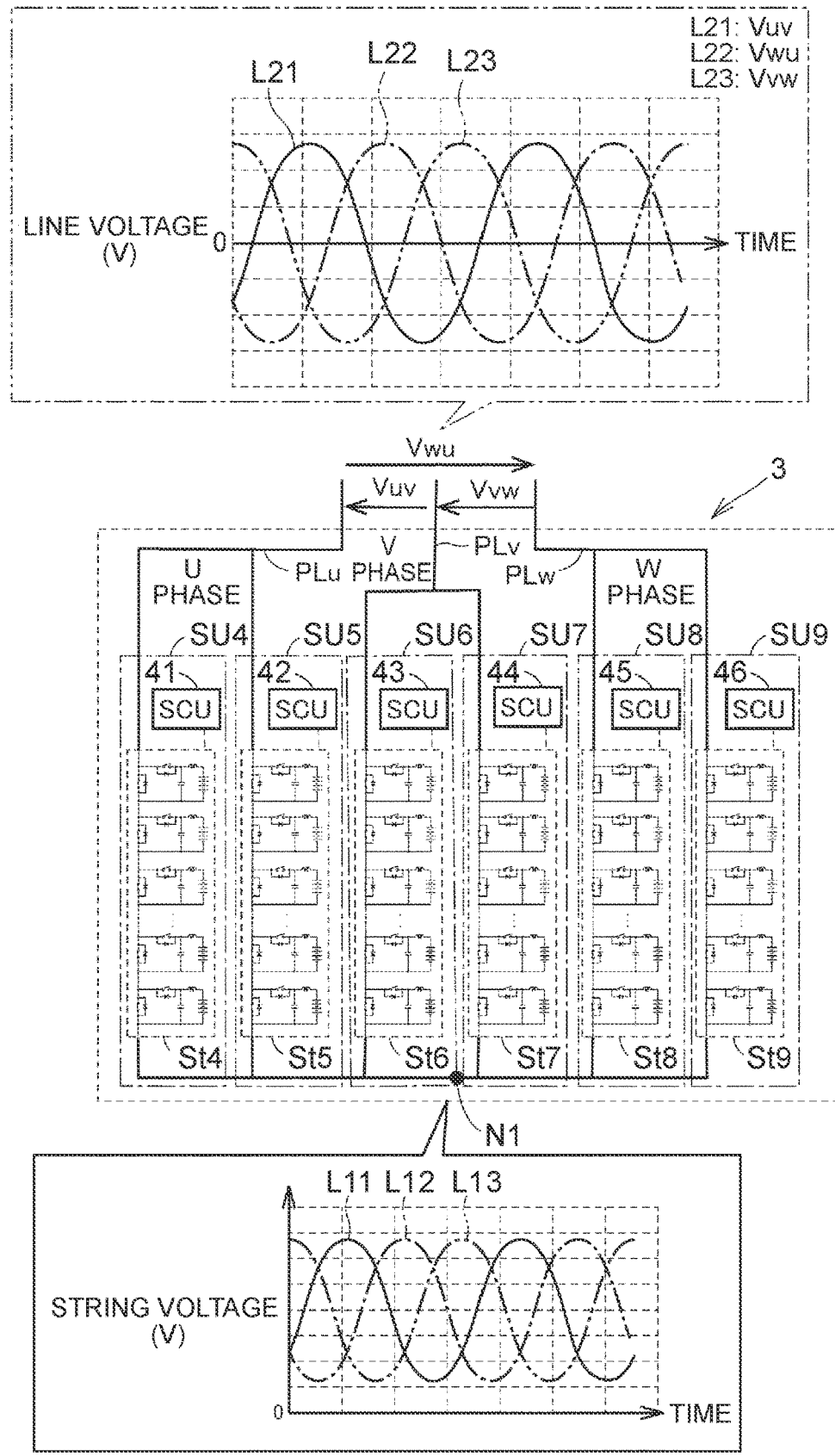
FIG. 9 shows a configuration of a second power supply circuit.

FIG. 9 shows a configuration of the second power supply circuit 3. Referring to FIG. 9, the battery strings St4, St5, St6, St7, St8, and St9 correspond to a first U-phase battery string, a second U-phase battery string, a first V-phase battery string, a second V-phase battery string, a first W-phase battery string, and a second W-phase battery string, respectively.

A positive terminal of the battery string St4 and a positive terminal of the battery string St5 are connected to an electrical wire PLu. A positive terminal of the battery string St6 and a positive terminal of the battery string St7 are connected to an electrical wire PLv. A positive terminal of the battery string St8 and a positive terminal of the battery string St9 are connected to an electrical wire PLw. Negative terminals of the battery strings St4 to St9 are connected to a neutral point N1. In the second power supply circuit 3, the battery strings St4, St5 connected in parallel, the battery strings St6, St7 connected in parallel, and the battery strings St8, St9 connected in parallel are Y-connected.

The SCUs 41 to 46 control the SWs 51, 52 of the battery circuit modules M shown in FIG. 2 at a switching frequency of several tens of kilohertz according to control commands from the GCU 100 to control the string voltages (output voltages) of the battery strings St4 to St9 so that these string voltages have voltage waveforms shown at the bottom of FIG. 9. In FIG. 9, line L11 represents the string voltage of the U-phase battery strings (battery strings St4, St5). Line L12 represents the string voltage of the V-phase battery strings (battery strings St6, St7). Line L13 represents the string voltage of the W-phase battery strings (battery strings St8, St9). Lines L11, L12, and L13 are sine waves that are 120° apart in phase, and their frequency is a frequency corresponding to the power grid PG (e.g., 60 Hz).

As the string voltages of the battery strings St4 to St9 are controlled as described above, the line voltages of the electrical wires PLu, PLv, and PLw have voltage waveforms shown at the top of FIG. 9. In FIG. 9, line L21 represents the line voltage "Vuv" between the electrical wires PLu, PLv, line L22 represents the line voltage "Vwu" between the electrical wires PLw, PLu, and line L23 represents the line voltage "Vvw" between the electrical wires PLv, PLw. Each line voltage has a sinusoidal AC waveform that periodically changes in polarity (positive or negative).

As described above, the second power supply circuit 3 outputs three-phase AC power (second AC power) using the battery strings St4 to St9. In the second power supply circuit 3, the U-phase battery strings (battery strings St4, St5), the V-phase battery strings (battery strings St6, St7), and the W-phase battery strings (battery strings St8, St9) are Y-connected. The second power supply circuit 3 can therefore output AC power (more specifically, three-phase AC power) without using an inverter. This configuration reduces cost. In the second power supply circuit 3 according to the present embodiment, a plurality of battery strings connected in parallel is used as the AC battery strings of each phase. As the number of AC battery strings connected in parallel becomes greater, it becomes easier to finely adjust the AC power waveform output from the second power supply circuit 3. The number of AC battery strings in the second power supply circuit 3 is not limited to six, and can be changed as appropriate. The second power supply circuit 3 may include three AC battery strings, or may include one AC battery string. The second power supply circuit 3 may be configured to output single-phase AC power.

Figure 10:
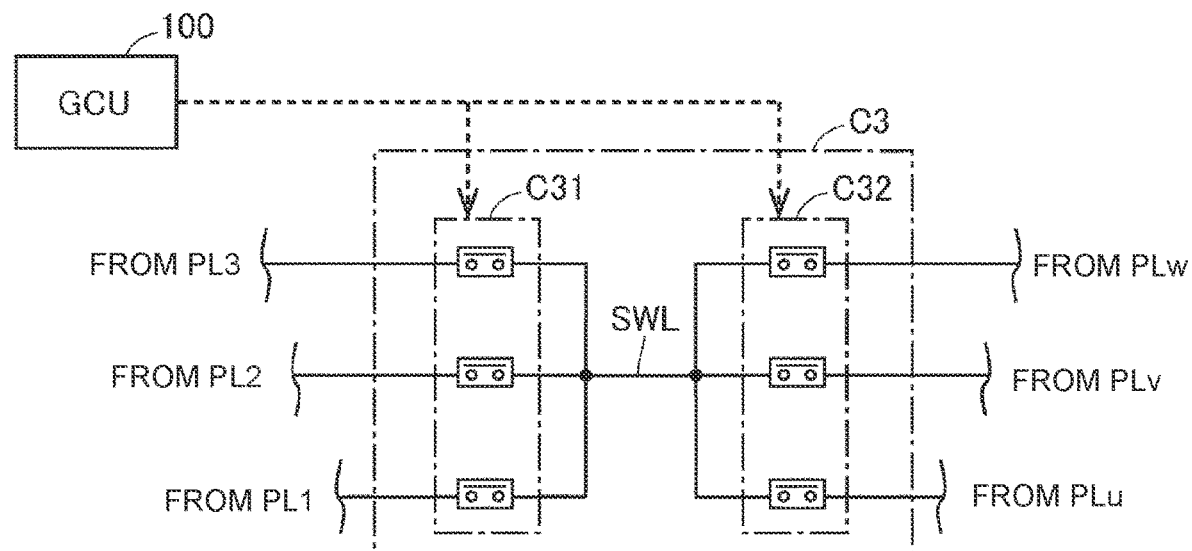
FIG. 10 shows a detailed configuration of a switching device shown in FIG. 1.

Referring back to FIG. 1, the sweep units SU1 to SU3 in the first power supply circuit 2 and the sweep units SU4 to SU9 in the second power supply circuit 3 are connected via the switching device C3. FIG. 10 shows a detailed configuration of the switching device C3.

Referring to FIG. 10 together with FIG. 1, the electrical wires PL (FIG. 2) of the battery strings St1 to St3 are connected to one end of the switching device C3, and the electrical wires PLu, PLv, and PLw are connected to the other end of the switching device C3. Hereinafter, the electrical wire PL of the battery string St1 is also referred to as "electrical wire PL1," the electrical wire PL of the battery string St2 is also referred to as "electrical wire PL2," and the electrical wire PL of the battery string St3 is also referred to as "electrical wire PL3." The switching device C3 electrically insulates the electrical wires PL1 to PL3 from the electrical wires PLu, PLv, PLw when not instructed by the GCU 100. When instructed by the GCU 100, the switching device C3 connects any one or more of the electrical wires PL1 to PL3 and any one or more of the electrical wires PLu, PLv, PLw according to the instruction of the GCU 100.

Specifically, the switching device C3 includes relay devices C31, C32 and an electrical wire SWL connecting the relay device C31 and the relay device C32. The relay device C31 is configured to switch between connection of each of the electrical wires PL1 to PL3 to the electrical wire SWL and disconnection of each of the electrical wires PL1 to PL3 from the electrical wire SWL. In the present embodiment, the relay device C31 includes a relay for each electrical wire. The relay device C31 can connect one or more electrical wires selected from the electrical wires PL1 to PL3 to the electrical wire SWL, and can disconnect all of the electrical wires PL1 to PL3 from the electrical wire SWL. The relay device C32 is configured to switch between connection of each of the electrical wires PLu, PLv, and PLw to the electrical wire SWL and disconnection of each of the electrical wires PLu, PLv, and PLw from the electrical wire SWL. In the present embodiment, the relay device C32 includes a relay for each electrical wire. The relay device C32 can connect one or more electrical wires selected from the electrical wires PLu, PLv, and PLw to the electrical wire SWL, and can disconnect all of the electrical wires PLu, PLv, PLw from the electrical wire SWL.

In the present embodiment, each of the relay devices C31, C32 includes a normally-open (NO) contact relay for each wire. Each NO contact relay in the relay devices C31, C32 is controlled by the GCU 100. However, the disclosure is not limited to this, and the configuration of the switching device C3 can be modified as appropriate. Each of the relay devices C31, C32 may include a relay that switches a plurality of contacts, such as a change-over (CO) contact relay.

Figure 11:
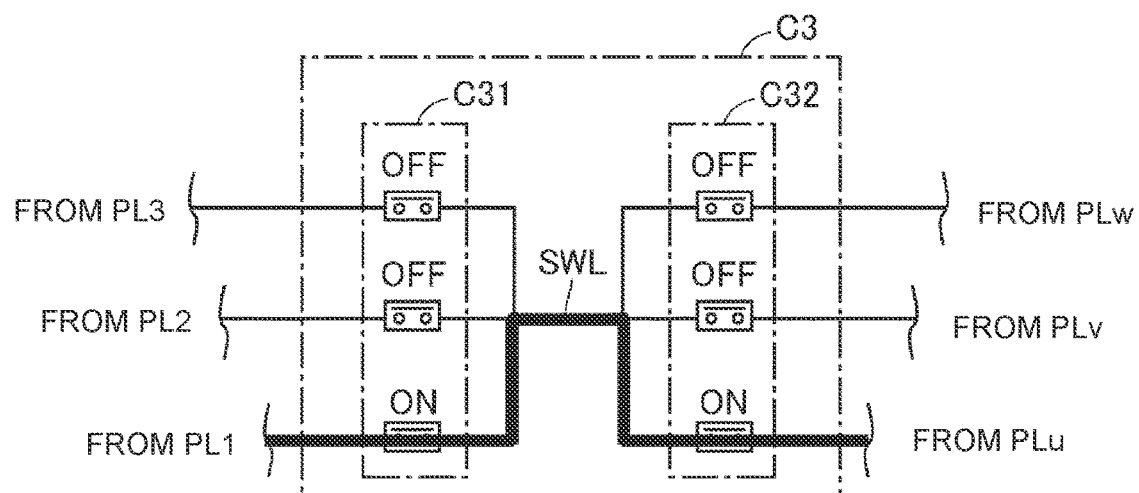
FIG. 11 shows an example of the operation of the switching device shown in FIG. 10.

FIG. 11 shows an example of the operation of the switching device C3. Referring to FIG. 11, when the GCU 100 controls the switching device C3 to connect the electrical wire PL1 and the electrical wire PLu, the GCU 100 connects the electrical wire PL1 and the electrical wire SWL by the relay device C31, and connects the electrical wire PLu and the electrical wire SWL by the relay device C32. As a result, the positive electrode of the battery string St1 and the positive electrodes of the battery strings St4, St5 are electrically connected, so that power can be transferred between the battery string St1 and the battery strings St4, St5. As described above, in the power supply system 1, the AC battery strings (battery strings St4 to St9) and the DC battery strings (battery strings St1 to St3) are configured such that power is transferred (i.e., power transfer is performed) therebetween. When charging the batteries B in the AC battery strings (e.g., battery strings St4, St5) by the DC battery string (e.g., battery string St1), the GCU 100 makes the voltage of the AC battery strings lower than the voltage of the DC battery string so that power is supplied from the DC battery string to the AC battery strings. When supplying power from the AC battery strings to the DC battery string, the GCU 100 makes the voltage of the DC battery strings lower than the voltage of the AC battery string. In the present embodiment, power is mainly transferred between the DC battery string and the AC battery string. However, power may also be transferred between the DC battery strings or between the AC battery strings.

Referring back to FIG. 1, the AC power output from the first power supply circuit 2 is supplied to the electrical wires PGL via the insulation filter T1, the relay R1, and the distribution board C1. The AC power output from the second power supply circuit 3 is supplied to the electrical wires PGL via the insulation filter T2, the relay R2, and the distribution board C1. The power supply system 1 is configured to reversely supply the three-phase AC power from at least one of the first power supply circuit 2 and the second power supply circuit 3 to the power grid PG in grid-connected operation.

Each of the insulation filters T1, T2 includes, for example, an LCL filter and a three-phase transformer. Each of the insulation filters T1, T2 reduces the noise component of the three-phase AC power using the LCL filter, and converts the three-phase AC power to a predetermined voltage (e.g., 200 V) and insulates the input and output sides using the three-phase transformer. In the present embodiment, the inverters 11, 21, and 31 are reused products used for another purpose (for driving an xEV), and do not necessarily have high performance. Therefore, the inverter outputs tend to contain noise. The insulation filter T1 disposed between the first power supply circuit 2 and the electrical wires PGL is configured to remove such noise. The insulation filter T1 may have a higher noise reduction capability than the insulation filter T2.

Each of the relays R1, R2 is, for example, an electromagnetic mechanical relay. The GCU 100 is configured to switch the state of the first power supply circuit 2 and the power grid PG between a connected state (parallel-on state) and a disconnected state (parallel-off) by controlling ON and OFF of the relay R1. The GCU 100 is also configured to switch the state of the second power supply circuit 3 and the power grid PG between a connected state (parallel-on state) and a disconnected state (parallel-off state) by controlling ON and OFF of the relay R2.

The distribution board C1 supplies power from the power grid PG to each of the first power supply circuit 2 and the second power supply circuit 3. The distribution board C1 also supplies power from at least one of the first power supply circuit 2 and the second power supply circuit 3 to the power grid PG and/or the building 300 (distribution board C2). The AC power output from the first power supply circuit 2 and the AC power output from the second power supply circuit 3 together with the AC power output from the power grid PG are supplied to the electrical wires PGL and are further supplied to the wires in the building 300 via the distribution board C2.

The power supply system 1 is configured to perform a first output for outputting AC power (first AC power) only from the first power supply circuit 2 out of the first power supply circuit 2 and the second power supply circuit 3, a second output for outputting AC power (second AC power) only from the second power supply circuit 3 out of the first power supply circuit 2 and the second power supply circuit 3, and both outputs for outputting AC power (first AC power and second AC power) from both of the first power supply circuit 2 and the second power supply circuit 3. In the both outputs, the first power supply circuit 2 and the second power supply circuit 3 output AC power simultaneously. The power supply system 1 is also configured to perform a first input for inputting AC power only to the first power supply circuit 2 out of the first power supply circuit 2 and the second power supply circuit 3, a second input for inputting AC power only to the second power supply circuit 3 out of the first power supply circuit 2 and the second power supply circuit 3, and both inputs for inputting AC power to both of the first power supply circuit 2 and the second power supply circuit 3. In the both inputs, the AC power is simultaneously input to the first power supply circuit 2 and the second power supply circuit 3. In the present embodiment, the GCU 100 selects and performs one of the following: the first output, the second output, the both outputs, the first input, the second input, and the both inputs.

The GCU 100 is configured to switch among the first output, the second output, and the both outputs. The GCU 100 is configured to switch among the first input, the second input, and the both inputs. The GCU 100 keeps the relay R1 in the ON state and the relay R2 in the OFF state while performing the first output or the first input. The GCU 100 keeps the relay R1 in the OFF state and the relay R2 in the ON state while performing the second output or the second input. The GCU 100 keeps both the relay R1 and the relay R2 in the ON state while performing the both outputs or the both inputs. When AC power is neither input to nor output from the first power supply circuit 2 and the second power supply circuit 3, the GCU 100 switches both the relay R1 and the relay R2 to the OFF state.

The server 200 shown in FIG. 1 requests power adjustment of the power grid PG to the GCU 100 as necessary. The server 200 may perform demand response (DR). For example, the server 200 presents power adjustment conditions to a user terminal. The power adjustment conditions indicate the content of the power adjustment (energy management) requested from the server 200. In the present embodiment, the power adjustment conditions include the kind of power adjustment (in the present embodiment, either AC power output or AC power input), the adjustment period (information indicating adjustment start time and adjustment end time), and the magnitude of requested power (kW). When the user of the power supply system 1 replies with acceptance to the server 200 in response to a notification of the presentation of the power adjustment conditions, a power adjustment contract is established between the electric power company (TSO) and the user. The user replying with acceptance means that the user accepts power adjustment under the presented conditions. In the present embodiment, the TSO presents the power adjustment conditions to the user. However, the disclosure is not limited to this. The aggregator or the power market may present the power adjustment conditions to the user.

When the user replies with acceptance, the presented power adjustment conditions are stored in the storage device of the GCU 100. The user terminal may be an in-vehicle terminal, a mobile terminal carried by the user, or the GCU 100. Examples of the mobile terminal include a laptop, a smartphone, a wearable device, an electronic key, and a service tool. The user terminal may be configured to return a signal indicating either acceptance or declination to the server 200 according to the user operation when the user terminal receives a notification of the presentation of the power adjustment conditions from the server 200. In a mode in which the user terminal is an in-vehicle terminal or a mobile terminal, the user terminal sends the power adjustment conditions accepted by the user to the GCU 100. The GCU 100 may be configured to automatically determine whether to accept or decline power adjustment based on the presented power adjustment conditions and the state of the power supply system 1 and send the determination result back to the server 200, when the GCU 100 receives a notification of the presentation of the power adjustment conditions from the server 200. When the GCU 100 replies with acceptance to the server 200, the GCU 100 stores the power adjustment conditions that the GCU 100 has accepted, in the storage device.

The server 200 starts sending a command to the GCU 100 when the adjustment start time comes. The server 200 thus remotely controls the input and output power of at least one of the first power supply circuit 2 and the second power supply circuit 3 so that the power adjustment of the power grid PG is performed. When the GCU 100 receives a command from the server 200 while the GCU 100 is in a state in which the remote control is allowed (hereinafter also referred to as "remote ON state"), the GCU 100 controls at least one of the first power supply circuit 2 and the second power supply circuit 3 according to the command from the server 200. This command may be a signal indicating an input/output current value (output current value or input current value). On the other hand, when the GCU 100 receives a command from the server 200 while the GCU 100 is in a state in which the remote control is prohibited (hereinafter also referred to as "remote OFF state"), the GCU 100 will not accept the command from the server 200.

The state of the GCU 100 regarding the remote control (remote ON state or remote OFF state) may be switched according to settings made by the user. Alternatively, the user terminal may switch the GCU 100 to the remote ON state by wired communication or wireless communication when the user terminal replies with acceptance to the server 200. In a mode in which the GCU 100 replies with acceptance to the server 200, the GCU 100 may switch from the remote OFF state to the remote ON state when the GCU 100 replies with acceptance to the server 200.

Figure 12:
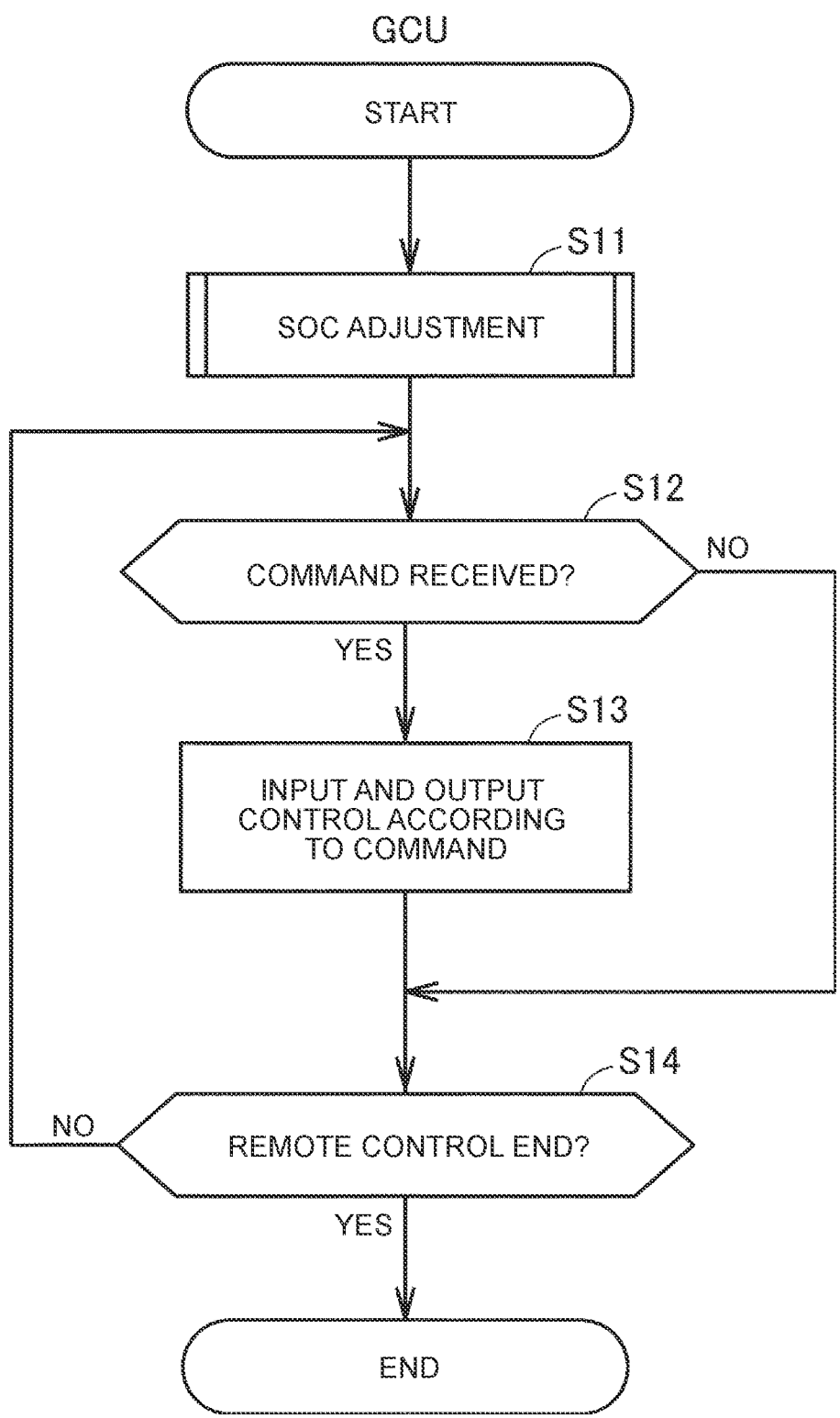
FIG. 12 is a flowchart showing an example of a process that is performed by a group control unit (GCU) (control device) in a remote ON state in the power supply system shown in FIG. 1.

FIG. 12 is a flowchart showing an example of a process that is performed by the GCU 100 in the remote ON state. The process shown in this flowchart is started when the GCU 100 switches from the remote OFF state to the remote ON state in the state in which there is accepted power adjustment that has not been performed yet (that is, in the state in which there is power adjustment that has been accepted by the user but has not been performed yet). Hereinafter, each step in the flowchart is simply represented by "S."

Figure 13:
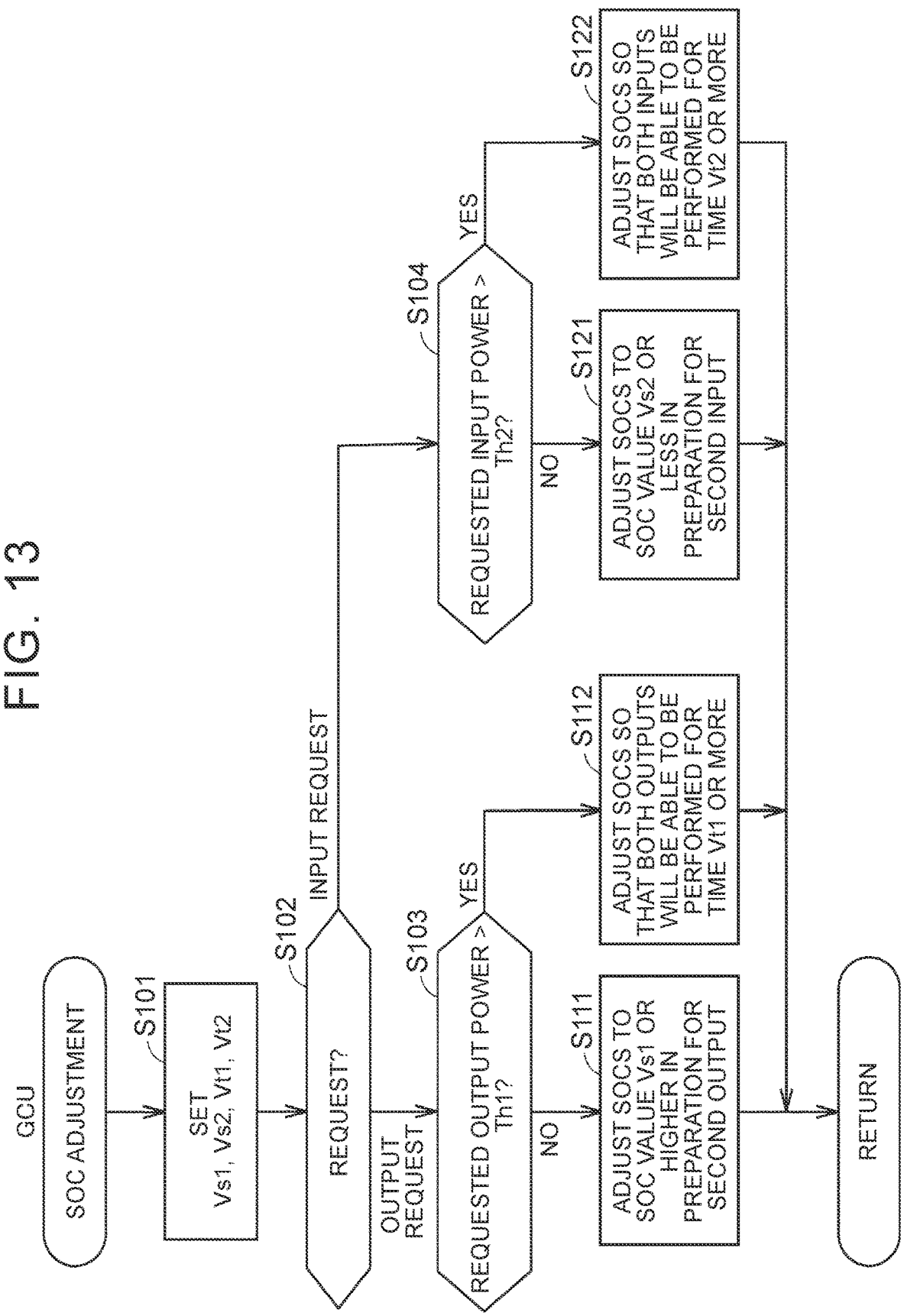
FIG. 13 is a flowchart showing details of SOC adjustment shown in FIG. 12.

Referring to FIG. 12 together with FIGS. 1 and 2, in S11, the GCU 100 adjusts the SOCs of the DC battery strings (battery strings St1 to St3) in the first power supply circuit 2 and the AC battery strings (battery strings St4 to St9) in the second power supply circuit 3, based on the accepted power adjustment conditions. FIG. 13 is a flowchart showing details of S11 (SOC adjustment).

Referring to FIG. 13 together with FIGS. 1 and 2, in S101, the GCU 100 sets a first SOC value, a first time, a second SOC value, and a second time that are to be used in S111, S112, S121, and S122 described later, respectively. Hereinafter, the first SOC value, the second SOC value, the first time, and the second time are referred to as "Vs1," "Vs2," "Vt1," and "Vt2," respectively.

In the present embodiment, the GCU 100 determines Vs1, Vs2, Vt1, and Vt2 using the requested adjustment period. The GCU 100 may set Vs1 to a higher value as the period of the requested AC power output (adjustment period) is longer. The GCU 100 may set Vs2 to a lower value as the period of the requested AC power input (adjustment period) is longer. Each of Vt1 and Vt2 may be the same as the adjustment period, or may be the adjustment period plus a margin (i.e., a period obtained by adding a margin to the adjustment period). In the present embodiment, only one of Vs1, Vt1, Vs2, and Vt2 is used according to the kind of requested power adjustment and the magnitude of requested power.

In the subsequent S102, the GCU 100 determines whether the kind of requested power adjustment is AC power output or AC power input. When the kind of requested power adjustment is AC power output, the routing proceeds to S103. When the kind of requested power adjustment is AC power input, the routine proceeds to S104.

In S103, the GCU 100 determines whether the requested output power (kW) is larger than a first reference value (hereinafter referred to as "Th1"). Th1 represents an output power range that should be handled by the second output rather than by the both outputs (i.e., Th1 represents an upper limit value of output power suitable for the second output). For example, Th1 may be set to a value experimentally obtained in advance by the user.

When the requested output power is Th1 or less (NO in S103), the GCU 100 causes the AC battery strings and the DC battery strings to transfer power therebetween in S111 so that the SOCs of the AC battery strings (e.g., the average value of the SOCs of the battery strings St4 to St9) become equal to or higher than Vs1. Specifically, the GCU 100 controls the first power supply circuit 2, the second power supply circuit 3, and the switching device C3 (FIG. 10) so that power is supplied from the DC battery strings (battery strings St1 to St3) to the AC battery strings (battery strings St4 to St9). At this time, the GCU 100 controls the switching deice C3 and the SWs 51, 52 (FIG. 2) in each battery string so that power is supplied from the DC batteries with high SOCs to the AC batteries with low SOCs. As a result, the SOCs of the AC battery strings become equal to or higher than Vs1, and the SOCs are equalized among the batteries.

When the requested output power is larger than Th1 (YES in S103), the GCU 100 adjusts the SOCs of the DC battery strings (battery strings St1 to St3) and the AC battery strings (battery strings St4 to St9) in S112 so that the both outputs will be able to be performed for the time Vt1 or more. Specifically, in consideration of the power consumption (predicted value) per unit time during the both outputs, the GCU 100 determines target SOCs of the AC battery strings and the DC battery strings so that the both outputs will be able to be performed for the time Vt1 or more. The GCU 100 then controls the switching device C3 (FIG. 10) to cause the AC battery strings and the DC battery strings to transfer power therebetween. The GCU 100 makes the SOCs of the AC battery strings and the DC battery strings closer to their target SOCs while controlling the first power supply circuit 2, the second power supply circuit 3, and the switching device C3. The SOCs of the DC battery strings (e.g., the average value of the SOCs of the battery strings St1 to St3) and the SOCs of the AC battery strings (e.g., the average value of the SOCs of the battery strings St4 to St9) are thus adjusted in a balanced manner.

In the process shown in FIG. 13, the routine proceeds to S111 when the requested output power is equal to Th1. However, the process may be modified so that the routine proceeds to S112 rather than to S111 when the requested output power is equal to Th1.

In S104, the GCU 100 determines whether the requested input power (kW) is larger than a second reference value (hereinafter referred to as "Th2"). Th2 represents an input power range that should be handled by the second input rather than by the both inputs (i.e., Th2 represents an upper limit value of input power suitable for the second input). For example, Th2 may be set to a value experimentally obtained in advance by the user.

When the requested input power is Th2 or less (NO in S104), the GCU 100 causes the AC battery strings and the DC battery strings to transfer power therebetween in S121 so that the SOCs of the AC battery strings (e.g., the average value of the SOCs of the battery strings St4 to St9) become equal to or less than Vs2. Specifically, the GCU 100 controls the first power supply circuit 2, the second power supply circuit 3, and the switching device C3 (FIG. 10) so that power is supplied from the AC battery strings (battery strings St4 to St9) to the DC battery strings (battery strings St1 to St3). At this time, the GCU 100 controls the switching deice C3 and the SWs 51, 52 (FIG. 2) in each battery string so that power is supplied from the AC batteries with high SOCs to the DC batteries with low SOCs. As a result, the SOCs of the AC battery strings become equal to or less than Vs2, and the SOCs are equalized among the batteries.

When the requested input power is larger than Th2 (YES in S104), the GCU 100 adjusts the SOCs of the DC battery strings (battery strings St1 to St3) and the AC battery strings (battery strings St4 to St9) in S122 so that the both inputs will be able to be performed for the time Vt2 or more. Specifically, in consideration of the power consumption (predicted value) per unit time during the both inputs, the GCU 100 determines target SOCs of the AC battery strings and the DC battery strings so that the both inputs will be able to be performed for the time Vt2 or more. The GCU 100 then controls the switching device C3 (FIG. 10) to cause the AC battery strings and the DC battery strings to transfer power therebetween. The GCU 100 makes the SOCs of the AC battery strings and the DC battery strings closer to their target SOCs while controlling the first power supply circuit 2, the second power supply circuit 3, and the switching device C3. The SOCs of the DC battery strings (e.g., the average value of the SOCs of the battery strings St1 to St3) and the SOCs of the AC battery strings (e.g., the average value of the SOCs of the battery strings St4 to St9) are thus adjusted in a balanced manner.

In the process shown in FIG. 13, the routine proceeds to S121 when the requested input power is equal to Th2. However, the process may be modified so that the routine proceeds to S122 rather than to S121 when the requested input power is equal to Th2.

When the SOC adjustment is performed in any one of S111, S112, S121, and S122, the series of steps shown in FIG. 13 ends, and the routine proceeds to S12 in FIG. 12.

Referring back to FIG. 12 together with FIGS. 1 and 2, the GCU 100 determines in S12 whether it has received a command from the server 200. When the GCU 100 has not received a command from the server 200 (NO in S12), the routine proceeds to S14. In S14, the GCU 100 determines whether a remote control end condition is satisfied. When the remote control end condition is not satisfied (NO in S14), the routine returns to S12. For example, the remote control end condition is satisfied when the GCU 100 switches to the remote OFF state. The remote control end condition is also satisfied when the GCU 100 receives an end notification from the server 200. However, the disclosure is not limited to this, and the remote control end condition can be set as desired.

When the GCU 100 receives a command from the server 200 (YES in S12), the GCU 100 performs input and output control according to the command in S13.

For example, when the requested power adjustment is AC power output and the requested output power is less than Th1, the GCU 100 performs the second output according to the command. AC power that meets the request (that is, AC power according to the command) is thus output from the second power supply circuit 3 (AC battery strings) to the power grid PG. As described above, the SOC adjustment for adjusting the SOCs of the AC battery strings to Vs1 or higher is performed before the second output is performed (see S111 in FIG. 13). The second output is performed after the SOCs of the AC battery strings become equal to or higher than Vs1.

When the requested power adjustment (energy management) is AC power output and the requested output power is larger than Th1, the GCU 100 performs the both outputs according to the above command. AC power that meets the request (that is, AC power according to the command) is thus output from the first power supply circuit 2 and the second power supply circuit 3 to the power grid PG. As described above, the SOC adjustment for the AC battery strings and the DC battery strings is performed before the both outputs is performed (see S112 in FIG. 13).

When the requested power adjustment is AC power input and the requested input power is less than Th2, the GCU 100 performs the second input according to the command. AC power that meets the request (that is, AC power according to the command) is thus input from the power grid PG to the second power supply circuit 3 (AC battery strings). As described above, the SOC adjustment for adjusting the SOCs of the AC battery strings to Vs2 or less is performed before the second input is performed (see S121 in FIG. 13). The second input is performed after the SOCs of the AC battery strings become equal to or less than Vs2.

When the requested power adjustment (energy management) is AC power input and the requested input power is larger than Th2, the GCU 100 performs the both inputs according to the above command. AC power that meets the request (that is, AC power according to the command) is thus input from the power grid PG to the first power supply circuit 2 and the second power supply circuit 3. As described above, the SOC adjustment for the AC battery strings and the DC battery strings is performed before the both inputs is performed (see S122 in FIG. 13).

When the GCU 100 performs the input and output control according to the command in S13, the routine proceeds to S14. The remote control (S12 to S13) according to the command from the server 200 is continued while the remote control end condition is not satisfied (NO in S14). The series of steps shown in FIG. 12 ends when the remote control end condition is satisfied (YES in S14). When the GCU 100 is in the remote ON state at the time when the remote control end condition is satisfied, the series of steps shown in FIG. 12 may end after the GCU 100 switches from the remote ON state to the remote OFF state.

The power supply system 1 may perform power adjustment of the power grid PG using local control that is not based on an external command. The GCU 100 may acquire a charge and discharge plan for power adjustment of the power grid PG in advance from the server 200. For example, the power adjustment conditions presented by the server 200 may include the charge and discharge plan. The charge and discharge plan is information indicating a charge and discharge profile (that is, a change in input and output power of the power supply system 1 from and to the power grid PG) in a predetermined period. When the start time of the charge and discharge plan for the accepted power adjustment comes, the GCU 100 may control the input and output power of at least one of the first power supply circuit 2 and the second power supply circuit 3 according to the charge and discharge plan.

Figure 14:
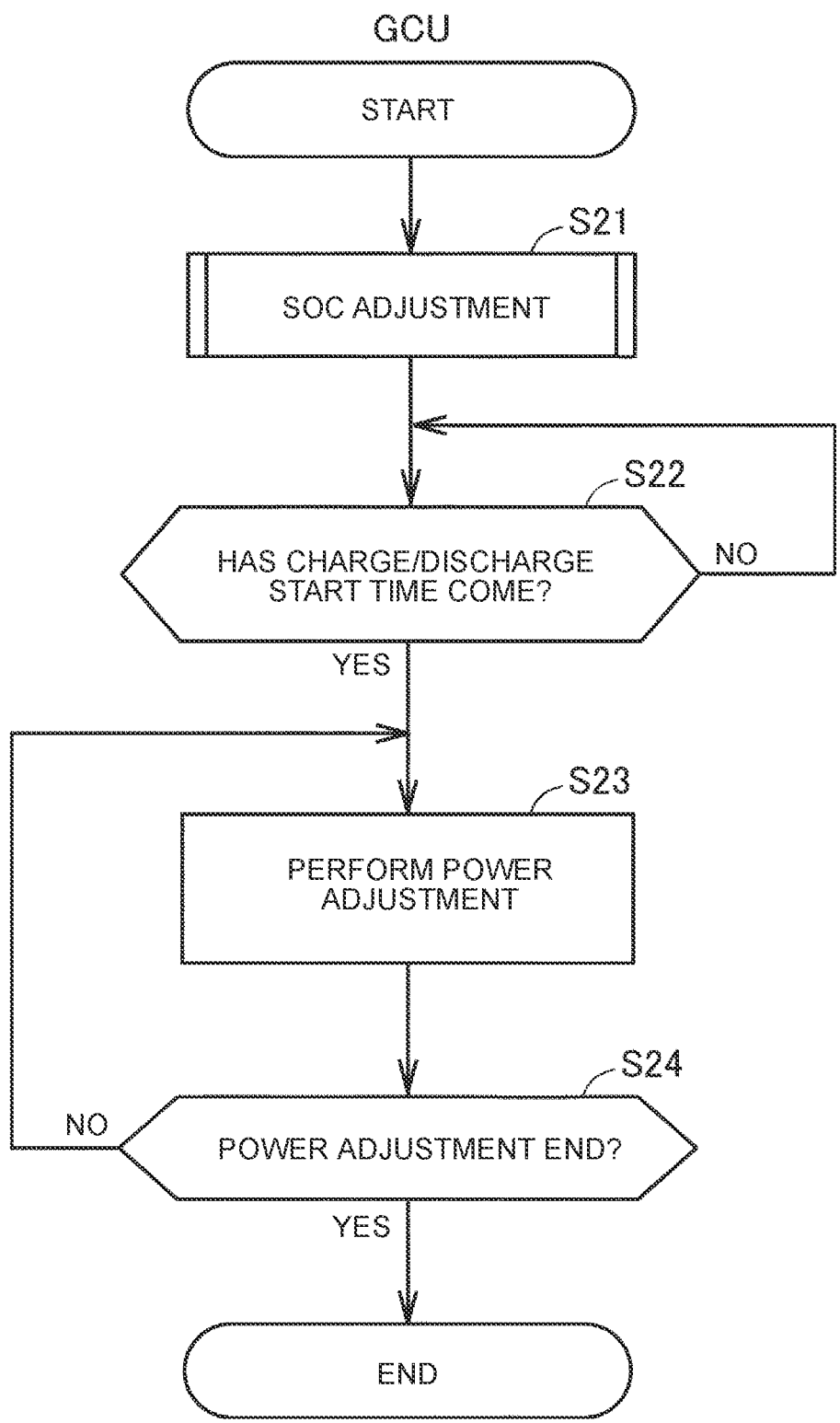
FIG. 14 is a flowchart showing an example of a process that is performed when the GCU (control device) shown in FIG. 1 performs power adjustment according to a predetermined charge and discharge plan.

FIG. 14 is a flowchart showing an example of a process that is performed when the GCU 100 performs power adjustment according to a predetermined charge and discharge plan. The process shown in this flowchart is started before the start time of the charge and discharge plan for the accepted power adjustment comes. For example, the series of steps shown in FIG. 14 may be started a predetermined amount of time (e.g., the amount of time selected from the range of 15 minutes or more and 3 hours or less, i.e., the range of 15 minutes to 3 hours) before the start time of the charge and discharge plan. In the present embodiment, the predetermined amount of time is set to an amount of time greater than that required for SOC adjustment (S21 in FIG. 14).

Referring to FIG. 14 together with FIGS. 1 and 2, the GCU 100 performs SOC adjustment in S21. In S21, the GCU 100 performs the process shown in FIG. 13 as in S11 of FIG. 12. Thereafter, in S22, the GCU 100 waits until the start time of the charge and discharge plan comes. When the start time of the charge and discharge plan comes, the routine proceeds to S23.

In S23, the GCU 100 performs input and output control according to the charge and discharge plan. At this time, the GCU 100 switches among the second output, the both outputs, the second input, and the both inputs according to the kind of requested power adjustment and the magnitude of requested power, as in S13 of FIG. 12 described above. When the GCU 100 performs the input and output control according to the charge and discharge plan in S23, the routine proceeds to S24. In S24, the GCU 100 determines whether a power adjustment end condition is satisfied. The power adjustment end condition is satisfied when the end time of the charge and discharge plan comes. The power adjustment end condition may also be satisfied when the GCU 100 receives an end notification from the server 200. The input and output control according to the charge and discharge plan (S23) is continued while the power adjustment end condition is not satisfied (NO in S24). The series of steps shown in FIG. 14 ends when the power adjustment end condition is satisfied (YES in S24).

As described above, the power supply system 1 according to the present embodiment is configured to output AC power to an object (electrical wires PGL) to which power is to be supplied. The power supply system 1 includes the first power supply circuit 2, the second power supply circuit 3, and the GCU 100 (control device). The first power supply circuit 2 includes the DC battery strings for DC power (battery strings St1, St2, and St3), and the inverters (inverters 11, 21, and 31) that convert DC power output from the DC battery strings to AC power. The first power supply circuit 2 is configured to output the first AC power using the DC battery strings and the inverters. The second power supply circuit 3 includes the AC battery strings for AC power (battery strings St4 to St9), and is configured to output the second AC power using the AC battery strings. The GCU 100 is configured to control the first power supply circuit 2 and the second power supply circuit 3. The AC battery strings and the DC battery strings are configured such that power is transferred therebetween (see FIGS. 10 and 11). Each of the AC battery strings and the DC battery strings includes multiple battery circuit modules M connected in series. Each of the battery circuit modules M includes: the battery B; the output terminals OT1, OT2 that output the voltage of the battery B; the first switch (SW 51) connected to the output terminals OT1, OT2 and connected in parallel with the battery B; and the second switch (SW 52) connected in series with the battery B. Each of the battery circuit modules M is configured so that the voltage of the battery B is applied between the output terminals OT1, OT2 when the first switch is in the electrically disconnected state and the second switch is in the electrically connected state (see FIG. 2). The GCU 100 is configured to adjust the SOCs of the AC battery strings and the DC battery strings by power transfer between the AC battery strings and the DC battery strings before performing requested power adjustment (energy management) (see S11 in FIG. 12, FIG. 13, and S21 in FIG. 14).

With the above configuration, each of the AC battery strings and the DC battery strings is adjusted to the state suitable for the requested power adjustment before the power adjustment (energy management) is performed. The GCU 100 can therefore easily respond to the requested power adjustment. Since the SOC adjustment is performed by power transfer between the AC battery strings and the DC battery strings, the SOC adjustment can be performed without receiving power supply from the outside.

In the above embodiment, the power density of each of the batteries in the DC battery strings is higher than the power density of each of the batteries in the AC battery strings. The energy density of each of the batteries in the AC battery strings is higher than the energy density of each of the batteries in the DC battery strings. Since high capacity batteries are used for low-rate power supply or charging, the power supply system 1 according to the above embodiment can easily perform power supply or charging for a long time. Moreover, since high power batteries and high capacity batteries are used for high-rate power supply or charging, the power supply system 1 according to the above embodiment can more suitably perform power supply or charging for a long time. Combining the high capacity batteries and the high power batteries reduces the required number of batteries and reduces battery cost as compared to a case where the same power supply capability or the same charging capability is provided by the high-capacity batteries alone. In the power supply system 1 according to the above embodiment, since the DC battery strings are not used for low-rate input and output, degradation of the DC batteries (high power batteries) in the DC battery strings is restrained.

In the power adjustment described above (see FIGS. 12 to 14), the second output, the both outputs, the second input, and the both inputs are performed, but the first output and the first input are not performed. The power supply system 1 may be configured to perform either the first output or the first input in response to a request from the user. The power supply system 1 may supply power to the building 300 by, for example, the first output. However, it is not essential that the power supply system 1 be configured to perform the first output and the first input.

The building 300 may be equipped with power generation equipment (e.g., variable renewable energy source such as solar power generation equipment or wind power generation equipment). The power supply system 1 may be configured to store surplus power generated by the power generation equipment in a predetermined battery string. The power supply system 1 may be configured to output power from a predetermined battery string to the building 300 in response to a request from the building 300.

The embodiment disclosed herein should be considered to be illustrative and not restrictive in all respects. The scope of the disclosure is shown by the scope of claims rather than by the above description of the embodiment, and is intended to include all modifications within the meaning and scope equivalent to the scope of claims.

What is claimed is:

1. A power supply system comprising:
  a first power supply circuit including a direct-current battery string for direct-current power and an inverter that converts direct-current power output from the direct-current battery string to alternating-current power, the first power supply circuit being configured to output first alternating-current power with use of the direct-current battery string and the inverter;
a second power supply circuit including an alternating-current battery string for alternating-current power, the second power supply circuit being configured to output second alternating-current power with use of the alternating-current battery string; and
a control device configured to control the first power supply circuit and the second power supply circuit, wherein:
the alternating-current battery string and the direct-current battery string are configured such that power transfer is performed between the alternating-current battery string and the direct-current battery string;
each of the alternating-current battery string and the direct-current battery string includes multiple battery circuit modules connected in series;
each of the battery circuit modules includes
a battery,
an output terminal that outputs a voltage of the battery,
a first switch connected to the output terminal and connected in parallel with the battery, and
a second switch connected in series with the battery;
each of the battery circuit modules is configured such that the voltage of the battery is applied to the output terminal when the first switch is in an electrically disconnected state and the second switch is in an electrically connected state; and
the control device is configured to adjust a state of charge of each of the alternating-current battery string and the direct-current battery string by the power transfer between the alternating-current battery string and the direct-current battery string before performing requested energy management.

2. The power supply system according to claim 1, wherein the control device is configured to:
cause the direct-current battery string to perform power supply to the alternating-current battery string such that the state of charge of the alternating-current battery string becomes equal to or higher than a first state of charge value when the requested energy management is alternating-current power output and requested output power is smaller than a first reference value; and
cause the second power supply circuit to output alternating-current power that meets a request after the state of charge of the alternating-current battery string becomes equal to or higher than the first state of charge value.

3. The power supply system according to claim 2, wherein the control device is configured to adjust the state of charge of each of the alternating-current battery string and the direct-current battery string such that both the first power supply circuit and the second power supply circuit are able to output alternating-current power simultaneously for a first time or more, and then cause the first power supply circuit and the second power supply circuit to output alternating-current power that meets the request, when the requested energy management is the alternating-current power output and the requested output power is larger than the first reference value.

4. The power supply system according to claim 3, wherein the control device is configured to determine the first state of charge value and the first time using a period of the alternating-current power output that is requested.

5. The power supply system according to claim 1, wherein the control device is configured to:
cause the alternating-current battery string to perform power supply to the direct-current battery string such that the state of charge of the alternating-current battery string becomes equal to or less than a second state of charge value when the requested energy management is alternating-current power input and requested input power is smaller than a second reference value; and
input alternating-current power that meets a request to the second power supply circuit after the state of charge of the alternating-current battery string becomes equal to or less than the second state of charge value.

6. The power supply system according to claim 5, wherein the control device is configured to adjust the state of charge of each of the alternating-current battery string and the direct-current battery string such that alternating-current power is able to be input to the first power supply circuit and the second power supply circuit simultaneously for a second time or more, and then input alternating-current power that meets the request to the first power supply circuit and the second power supply circuit, when the requested energy management is the alternating-current power input and the requested input power is larger than the second reference value.

7. The power supply system according to claim 6, wherein the control device is configured to determine the second state of charge value and the second time using a period of the alternating-current power input that is requested.

8. The power supply system according to claim 1, wherein:
a power density of each of the batteries included in the direct-current battery string is higher than a power density of each of the batteries included in the alternating-current battery string; and
an energy density of each of the batteries included in the alternating-current battery string is higher than an energy density of each of the batteries included in the direct-current battery string.

9. The power supply system according to claim 1, wherein:
each of the first power supply circuit and the second power supply circuit is electrically connected to an electrical wire connecting a building and an external power supply that supplies power to the building; and
the requested energy management is adjustment of power of the external power supply.

10. The power supply system according to claim 9, further comprising an insulation filter located between the first power supply circuit and the electrical wire, wherein the inverter is a reused product that was used for another purpose.

11. The power supply system according to claim 1, wherein:
the first power supply circuit includes a first drive circuit configured to drive the first switch and the second switch included in the direct-current battery string, and a first control circuit configured to send a signal for driving each of the first switch and the second switch to the first drive circuit according to a command from the control device; and
the second power supply circuit includes a second drive circuit configured to drive the first switch and the second switch included in the alternating-current battery string, and a second control circuit configured to send a signal for driving each of the first switch and the second switch to the second drive circuit according to a command from the control device.

12. The power supply system according to claim 11, wherein:

the inverter is a three-phase inverter;

the control device is configured to send a command for controlling the direct-current battery string to the first control circuit and control the inverter such that three-phase alternating-current power is output from the first power supply circuit;

the alternating-current battery string includes a U-phase battery string, a V-phase battery string, and a W-phase battery string that are Y-connected; and the control device is configured to send a command for controlling the U-phase battery string, the V-phase battery string, and the W-phase battery string to the second control circuit such that three-phase alternating-current power is output from the second power supply circuit.

* * * * *